US005592588A

United States Patent [19]
Reekes et al.

[11] Patent Number: 5,592,588
[45] Date of Patent: Jan. 7, 1997

[54] METHOD AND APPARATUS FOR OBJECT-ORIENTED DIGITAL AUDIO SIGNAL PROCESSING USING A CHAIN OF SOUND OBJECTS

[75] Inventors: James D. Reekes, San Jose; Kipley J. Olson, Redwood City, both of Calif.

[73] Assignee: Apple Computer, Inc., Cupertino, Calif.

[21] Appl. No.: 241,242

[22] Filed: May 10, 1994

[51] Int. Cl.$^6$ ........................................... G10L 9/00
[52] U.S. Cl. .......................................... 395/2.87; 395/2.67
[58] Field of Search ............................ 395/2, 2.67, 2.87, 395/650, 700

[56] References Cited

U.S. PATENT DOCUMENTS

| 5,283,900 | 2/1994 | Frankel et al. | 395/700 |
|---|---|---|---|
| 5,384,890 | 1/1995 | Anderson et al. | 395/2 |

OTHER PUBLICATIONS

"The Sound Manager", *Inside MacIntosh*, vol. VI, Chapter 22, Jun. 1991, pp. 22–1 thru 22–114.
Jim Reekes, "Somewhere In Quicktime", *Develop, Issue 16*, Dec. 1993, pp. 34–38.
Jim Reekes & Tom Thompson, "MacIntosh Sound revealed", *Byte*, Jul. 1991, pp. 249–250, 252, 254, 256, 258, 260, 262.
"Sound Components", *Inside MacIntosh: Sound*, Chapter 5, May 1994, pp. 5–1 thru 5–57.
"Component Manager", *Inside MacIntosh: More MacIntosh Toolbox*, Oct. 1993, pp. 6–1 thru 6–99.

*Primary Examiner*—Thomas G. Black
*Assistant Examiner*—John C. Loomis
*Attorney, Agent, or Firm*—Helene Plotka Workman

[57] ABSTRACT

An object-oriented audio signal processing system is disclosed. The signal processing system is capable of converting virtually any sound resource into a format which can be used by associated sound hardware to produce a sound. A signal processing system incorporating the invention comprises one or more chains formed by a plurality of sound objects serially connected. A sound object is a specialized task which performs a particular operation such as, for example, sample rate conversion of a sound resource, decompression of a sound resource, mixing multiple sound resources or retrieving sound resources from a software application. The sound objects are preferably modular and use substantially the same calling conventions and interface. A chain of sound objects processes digital audio signals into an output which can be maintained in a storage area, e.g. memory or disk or played on sound hardware. Chains which are formed to play sound on sound hardware preferably include a sound hardware object which is linked to the sound hardware. Preferably, objects other than sound hardware objects are sound hardware-independent, i.e. they do not have "knowledge" about specific sound hardware.

4 Claims, 15 Drawing Sheets

METHOD AND APPARATUS FOR OBJECT-ORIENTED DIGITAL AUDIO SIGNAL PROCESSING USING A CHAIN OF SOUND OBJECTS

RELATED APPLICATION

This application is related to co-pending application entitled "METHOD AND APPARATUS FOR MIXING MULTIPLE CHANNELS OF SAMPLED DIGITAL AUDIO USING A NON-LINEAR CLIPPING FUNCTION", filed concurrently herewith, which was commonly assigned or subject to an obligation of assignment to the same person at the time of invention.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD OF THE INVENTION

The invention relates generally to digital audio signal processing and playback and, more specifically, to an object-oriented architecture for converting a sound resource into a format usable by an audio hardware device in a computer.

BACKGROUND OF THE INVENTION

In a computer, a sound is typically represented and stored in a digital format, herein called a "sound resource." A sound resource has various properties or characteristics such as data size, data rate and compression. For example, a sound resource typically has a data size of 8 bits or 16 bits. A sound resource may or may not be compressed.

To play a sound represented by a sound resource a computer includes sound hardware which converts the sound resource into an audibly-perceptible analog signal. Examples of sound hardware are, among others, a digital signal processor ("DSP"), a digital to analog converter ("DAC") and a frequency modulation chip ("FM chip"). Generally, sound hardware has an associated software driver which provides communication to the sound hardware, serving as an application programmer's interface ("API") to the sound hardware. Typically, the API's for software drivers of different kinds of sound hardware are distinct from each other. Herein, the term "sound hardware mechanism" is used to denote this hardware and, where appropriate, associated software drivers.

A sound hardware mechanism typically operates on sound resources having particular properties or characteristics. For example, a sound hardware mechanism may successfully operate only on sound resources having a data size of 16-bits and a sample data rate of 22 kHz. In that case, a sound resource having a different data size or sample data rate is converted into the proper format before the sound hardware mechanism is invoked so that the sound hardware mechanism can successfully operate on the sound resource.

In some computers, such as a '386 processor-based system running a Windows operating system which complies with a Multimedia PC ("MPC") specification available from Microsoft Corporation, Redmond, Wash., software applications communicate directly with a software driver for the sound hardware and, thus, each application is responsible for providing sound resources which are in a format useable by that sound hardware mechanism. In these systems, to play a sound an application which uses sound resources that are in a format which differs from that expected by the sound hardware mechanism converts the appropriate sound resources into the format expected by the sound hardware mechanism. Such conversion of sound resources may entail sample rate converting, decompressing, mixing or other formatting operations.

In such computers, to play sound using a particular sound hardware mechanism, a software application is programmed with specific "knowledge" on how to communicate with that sound hardware mechanism and with "knowledge" on how to convert its sound resources into the expected format for that sound hardware mechanism. Since sound hardware mechanisms typically have a unique API, e.g. an API which is distinct from the API's of other sound hardware mechanisms, a software application is typically limited to using sound hardware mechanisms for which it is specifically programmed. Thus, it is extremely difficult, if not impossible, for a software application to use additional or subsequently-developed sound hardware mechanisms without additional programming and recompilation of the software application.

In a Macintosh operating system, version 7.0, an intermediary software layer, called a Sound Manager, is provided so that software applications communicate with the sound hardware mechanism via the Sound Manager, rather than communicating directly. The Sound Manager, rather than the individual applications, is responsible for converting sound resources, if appropriate, into a format useable by the sound hardware mechanism. Thus, software applications using the Sound Manager to play sounds can play sound resources without having "knowledge" as to the format requirements of the sound hardware mechanism. Moreover, the Sound Manager permits multiple applications to concurrently access/use the sound hardware mechanism. For a more in-depth description of the Sound Manager in the Macintosh operating system, version 7.0, see "Inside Macintosh", Vol. VI, Chapter 22, Addison-Wesley Publishing Co., 1991.

Although a software application can use the Sound Manager without knowledge of or dependence on the actual sound-producing hardware available in the computer, the Sound Manager itself is tightly coupled to the sound hardware mechanism. Thus, the Sound Manager typically is rewritten to some degree and recompiled to port the Sound Manager to a new sound hardware mechanism or to take advantage of new features in existing sound hardware mechanisms. Since the Sound Manager performs audio data processing internally, using its own filters to decompress audio data, convert sample rates, mix separate sound channels, it is difficult to add other data modification filters or to replace the existing filters with new methods, e.g. a new sample rate conversion algorithm.

SUMMARY OF THE INVENTION

Briefly, the invention is an object-oriented audio signal processing system, herein referred to as "SPS", capable of converting virtually any sound resource into a format which can be used by the sound hardware to produce a sound. The SPS architecture is based on the idea that the process of producing a sound can be divided into a number of specific steps, each of which has well-defined inputs and outputs.

An SPS incorporating the invention comprises one or more chains formed by a plurality of sound objects serially connected. A sound object is a specialized task which performs a particular operation on the digital audio samples in a sound resource such as, for example, sample rate conversion of a sound resource, decompression of a sound resource, mixing multiple sound resources or retrieving sound resources from a software application.

The sound objects in the SPS use substantially the same calling conventions and interface. Additionally, the sound objects are preferably modular, such that new sound objects can be inserted into a chain, either as an additional sound object or as a replacement for an existing sound object. Sound objects are self-contained and manage their own resources, including buffering, table generation and optimizations. They can be used as stand-alone objects or in series with other sound objects as described below.

Sound objects can be arranged in chains to process digital audio signals into an output which can be maintained in a storage area, e.g. memory or disk or played on sound hardware. For example, a chain of sound objects can be constructed to mix multiple sound resources into a single sound resource which is then stored in memory. Likewise, a chain of sound objects can be constructed to mix multiple sound resources into a single sound resource which is then played on the sound hardware. For descriptive purposes, a sound object from which a particular sound object in the chain requests data or otherwise calls is referred to as a "source" for that particular sound object. Preferably, a sound object performs its task at the request of a parent object, defined herein as a sound object for which the sound object performing the task is a source.

Typically, chains which are constructed to play sound on sound hardware include a sound hardware object linked to a sound hardware, the sound hardware object serving as both a software driver for the sound hardware and as a receptacle for requests from the sound hardware.

In a preferred embodiment, the SPS includes the following objects arranged so that they operate on a sound resource in the following order: a sound source object, a decompressor, a sample rate converter and a mixer. In a chain that is used to play a sound, a sound hardware object is preferably coupled to the mixer object in the chain and is further linked to the sound hardware.

Preferably, the SPS sets a baseline of functionality that the sound hardware can perform. For example, the baseline can be that sound hardware provides the following: system beeps/alert sounds, multiple channels of sound output, provide play from disc, sound input, particular decompression algorithms and different kinds of synthesis. However, the sound hardware can provide more functionality than the baseline.

The modularity and common interface of the SPS architecture provide a mechanism wherein sound objects can be easily inserted to add new functionality or replace or upgrade existing functionality. Likewise, new sound hardware can be easily integrated into the SPS by inserting a corresponding sound hardware object into an appropriate chain.

The sound objects other than the sound hardware objects are virtually hardware-independent. In other words, they are not specifically designed for a particular sound hardware or sound resource format. The object-oriented design of the SPS, along with this hardware-independence at levels other than the sound hardware object level, allows new sound hardware to be added to the SPS without significant rewriting or recompilation of the software applications and the hardware-independent sound objects. Thus, it is typically easier to port the SPS architecture to various sound hardware platforms, than it is to port prior audio signal processing systems.

Preferably, in the SPS architecture, in response to a request from a software application to play sound, the sound hardware object "pulls" data from the other sound objects in the chain. Since the sound hardware object pulls data from its source, the SPS does not need to include special timing services to determine at what rate to give data to the sound hardware. For example, in interrupt-driven systems, data requests can be initiated by interrupts without the use of an external timing source. The sound hardware object is simply notified by the application when to start playing and it is up to the sound hardware object to initiate requests for data.

In operation, a sound is played or produced in the following fashion. The sound hardware object issues a request for data to its source, typically a mixer. The source satisfies the request, performing appropriate processing tasks, one of which might be to get more data from its own source. The request is passed along the chain in this fashion until the request is satisfied or until it is indicated that the request can not be satisfied.

In a preferred embodiment, the SPS architecture includes optimizations for handling situations in which a sound object is acting as an intermediary between two other sound objects, passing data from one sound object to the other without performing any processing operation on the data. Such optimizations reduce the amount of data which has to be copied, thereby reducing the processing time.

DETAILED DESCRIPTION

Figure 1:
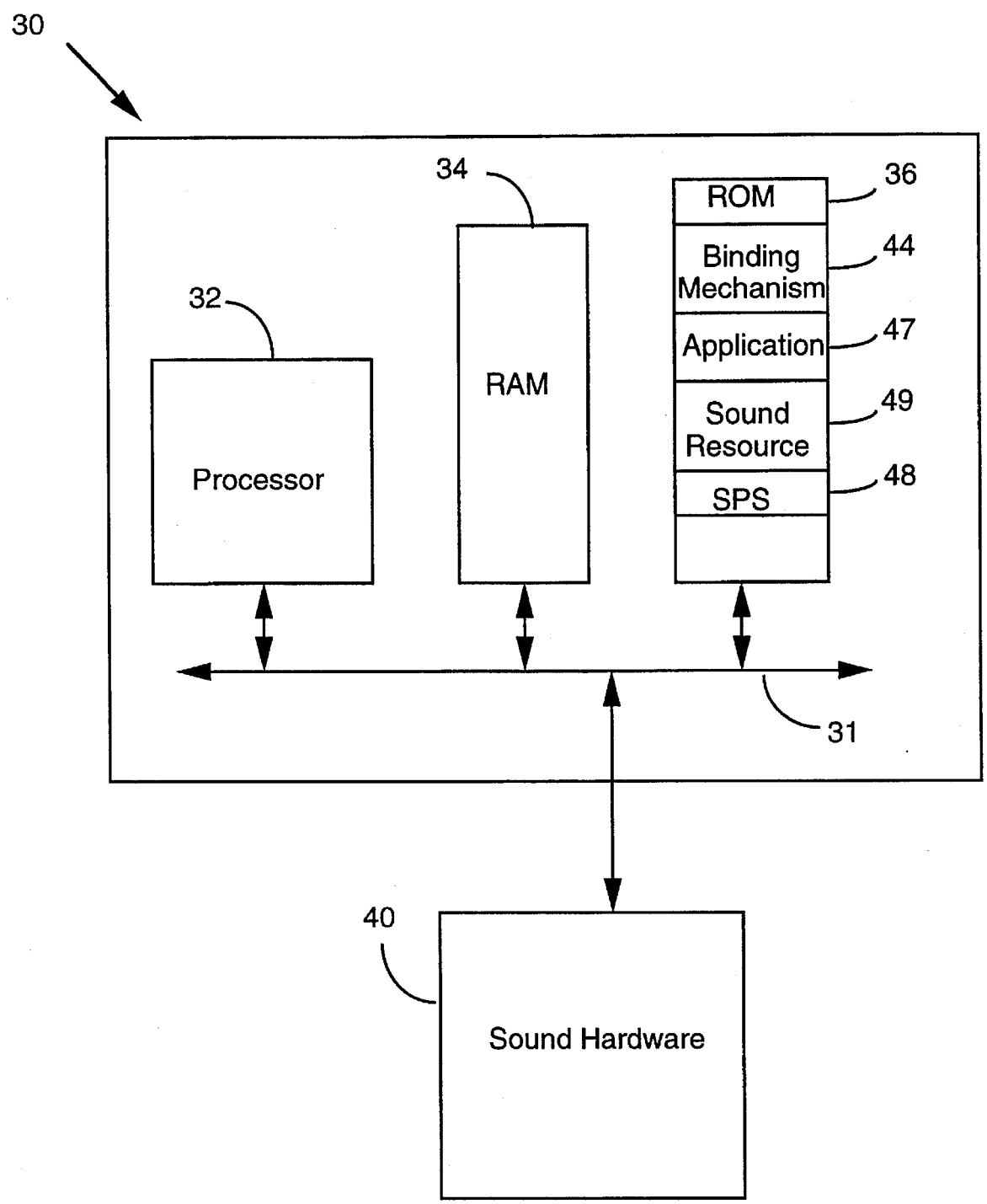
FIG. 1 illustrates generally a computer having an SPS incorporating the invention.

FIG. 1 illustrates generally a computer 30 having an SPS incorporating the invention. The computer 30 has a system bus 31 interconnecting a processor 32, random access memory 34 ("RAM"), read-only memory 36 ("ROM") and, optionally, sound hardware 40. The sound hardware 40 can be located in a variety of locations, e.g. built-in to a motherboard of the computer or available on a card which is inserted into a slot of the computer. The sound hardware 40 is included where a computer incorporating the invention is used to play sound, but need not be included if the computer is being used to process or produce digital audio signals, e.g. mix multiple channels, without actually playing sound.

The computer includes an object-oriented binding mechanism 44 for creating and manipulating sound objects. This binding mechanism 44 typically resides in ROM 36 or on other permanent storage, e.g. disk (not shown) and at runtime is loaded into RAM 34 unless it is stored in ROM, and executed by processor 32.

The binding mechanism 44 can be dynamic or static. Among other advantages, dynamic binding mechanisms 44 typically permit objects to be installed or replaced without recompiling of the operating system.

Among others, examples of object-oriented dynamic binding mechanisms 44 are the Component Manager, developed by Apple Computer, Inc., and the SOM or DSOM object message dispatching software developed by International Business Machines Corporation. The Component Manager is described in "Inside Macintosh: More Macintosh Toolbox", Chapter 9, Addison-Wesley Publishing Company, 1993. Among others, an example of a statically linked object-oriented system is a C++ language system.

The invention is equally applicable to other object-oriented binding mechanisms as well. Preferably, among other capabilities, a binding mechanism 44 links objects together, provides a common set of methods, i.e. API's for objects, and permits objects to over-ride and inherit the properties of it's super-class, i.e. source object.

The computer 30 further includes an SPS 48 incorporating the invention. Like the binding mechanism 44, the SPS 48 typically resides in ROM 36 or on other permanent storage, e.g. disk (not shown) and at runtime is loaded into RAM 34 unless it is stored in ROM and executed by processor 32.

Preferably, the computer 30 further includes software applications 47 and, optionally, sound resources 49. A software application 47 and its sound resources 49 typically reside in ROM 36 or on other permanent storage, e.g. disk (not shown) and are loaded into RAM 34 unless it is stored in ROM when the software application is executed. Sound resources 49 can also be generated in real-time while an application is executing.

Figure 2:
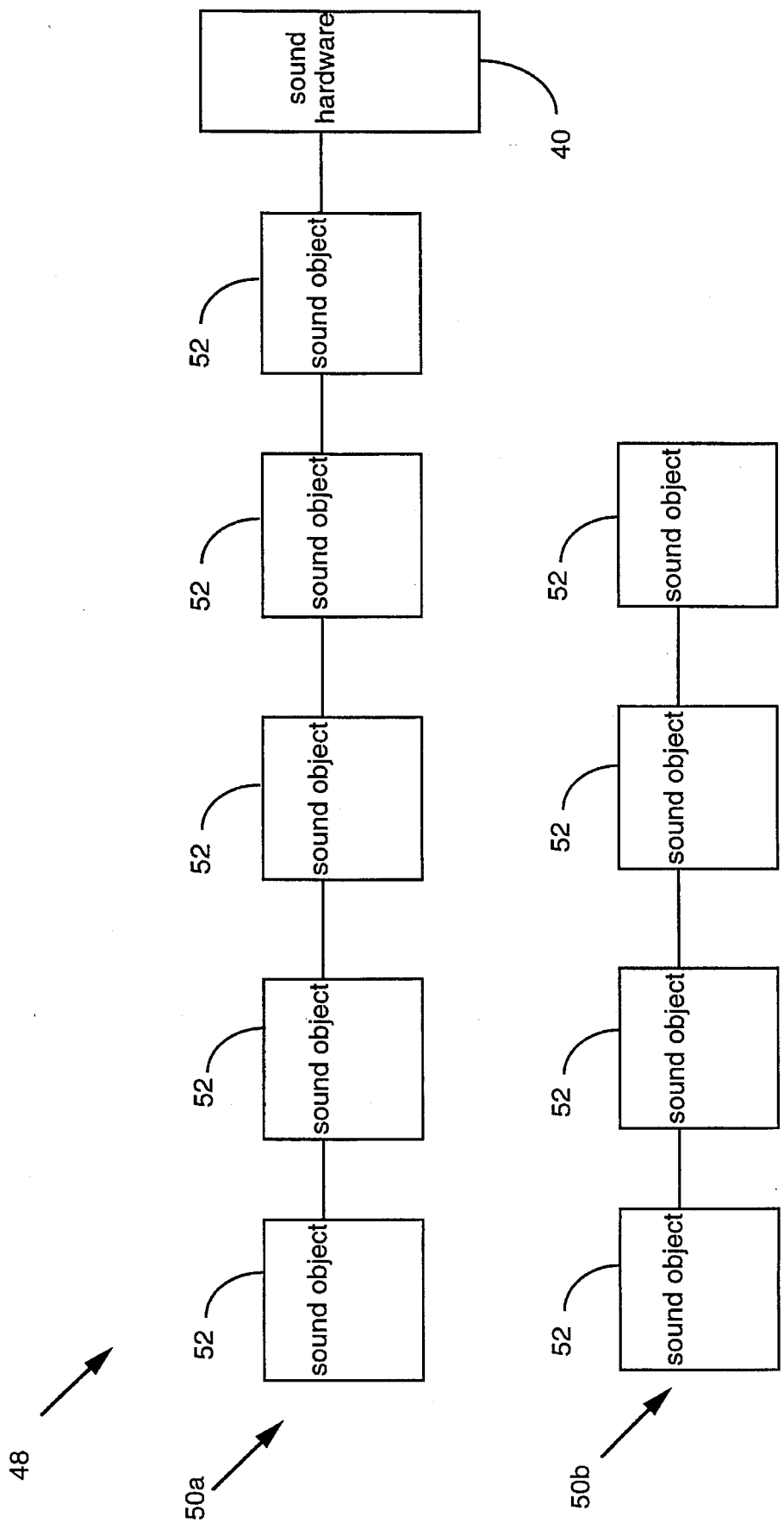
FIG. 2 shows an SPS of FIG. 1 comprising one or more chains of sound objects.

As shown in FIG. 2, an SPS 48 comprises one or more chains 50, each chain 50 having a plurality of sound objects 52 connected in series. A sound object 52 is a specialized task which performs a specific function in the process of converting a sound resource 49 into a format usable by the sound hardware 40. For example, such specific functions include, but are not limited to expanding compressed data into audio samples, sample rate converting the audio samples to a rate usable by the sound hardware, mixing the samples with other sounds that are playing, and writing the samples to the sound hardware 40. Thus, a sound object is a stand-alone module or code resource that performs some signal processing function or communicates with sound hardware 40. A sound object can have multiple output channels so that an instantiation of a sound object can be linked into more than one chain.

Sound objects 52 have a standard interface, e.g. common calling conventions, and each sound object 52 has local memory storage which allows the sound objects to be hooked together in series to perform complex tasks. Some sound objects 52 can also be used to control and communicate with the sound hardware 40, thereby shielding the other sound objects within the SPS 48 from the specifics of the sound hardware 40 with a procedural interface.

Sound objects 52 in the SPS 48 each support a common set of core subroutines and common data structures for representing sound resources. These routines perform operations like opening and closing sound objects, initializing internal buffers and state, and providing data and control information. In addition, some sound objects support additional routines to do sound object-specific operations like turning sound hardware on and off.

As shown in FIG. 2, a chain 50 may or may not be linked to sound hardware 40, depending upon whether the digital audio signals being processed by the chain are ultimately played as sound and/or are stored in memory or on disk. When the processed signals are to be played on the sound hardware, then a chain 50a is formed. Otherwise, a chain 50b is preferably formed.

For descriptive purposes, particular types of sound objects 52 are given specific names depending upon the function performed by the sound object. A sound object 52 which retrieves data, e.g. sound resources 49, from an application is herein called a "sound source object". A sound object 52 which is linked to sound hardware 40 is called a "sound hardware object". Sound objects which are capable of manipulating sound resources are also called "sound processing objects". Some sound processing objects are more specifically referred to in the following manner. A sound processing object 52 which decompresses samples stored in a sound resources 49 is called a "decompressor", while a sound processing object 52 which compresses samples stored in a sound resource is called a "compressor". A sound processing object 52 which performs sample rate conversion is called a "sample rate converter". Likewise, a sound processing object which mixes multiple data streams of sound resources 49 into a single data stream is called a "mixer". A sound object which converts between different sample formats, e.g. between 8-bit and 16-bit, between offset-binary and twos-complement and/or between mono and stereo, is called a "format converter". A sound object which supplies data to another sound object is called the "source" of that other sound object.

Figure 3:
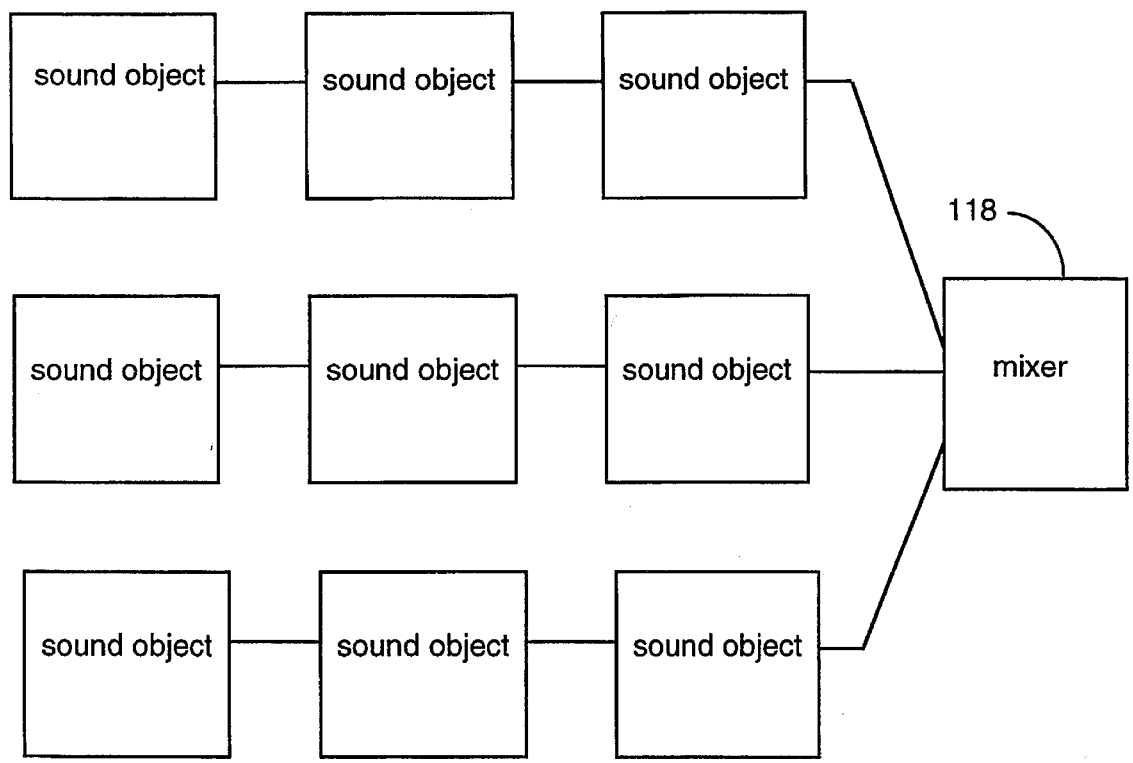
FIG. 3 shows a plurality of chains arranged for a mixer to receive multiple inputs.
Figure 4:
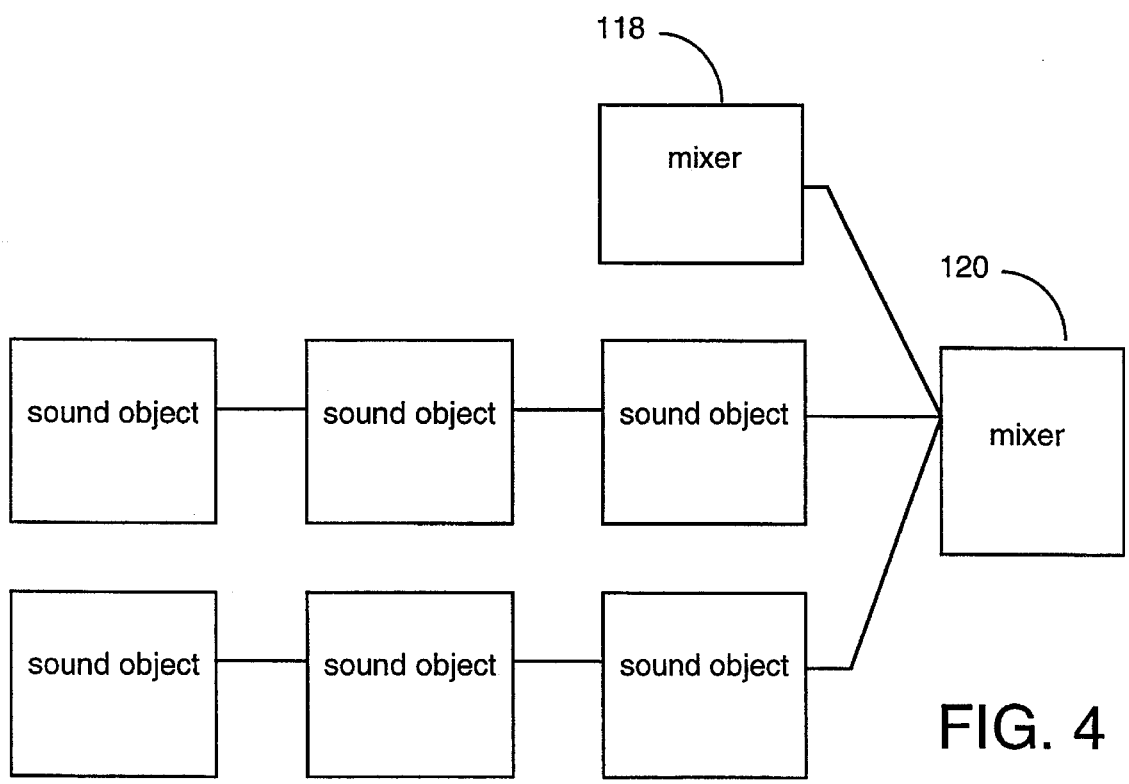
FIG. 4 shows that the output of the mixer of FIG. 3 can be used as an input into another mixer or chain.

The SPS 48 can comprise a plurality of chains 50 arranged in any one of a multitude of configurations. For example, as shown in FIG. 3, an SPS 48 can comprise a plurality of chains 50 arranged such that a mixer 118 is arranged to receive multiple input data streams which it mixes together to form a single output stream. As shown in FIG. 4, the output of the mixer 118 can then be used as input to another mixer 120 or other sound object in another chain. FIGS. 3 and 4 illustrate just one of many possible configurations. An SPS 48 incorporating the invention provides flexibility to form a configuration of interconnected or disjoint chains, the configuration being appropriate for the hardware configuration of the computer and adapted to maximize the advantages and features provided by the sound hardware and sound objects in the SPS.

Preferably, each chain 50 is uniquely identifiable by an associated chain identification so that a mixer capable of receiving inputs from multiple sources can identify from which source an input is being received. The chain identification for a chain 50 is preferably passed along whenever a chain is referenced. A chain identification can have any format which permits unique identifications to be formed, e.g. a four byte value.

Figure 5:
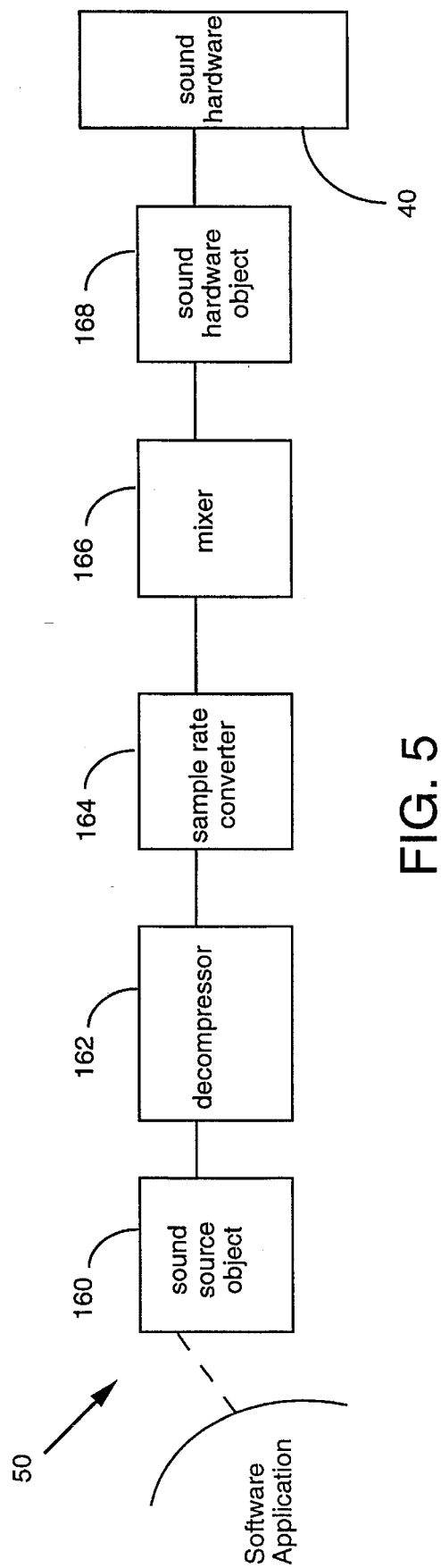
FIG. 5 illustrates a preferred ordering of sound objects in a chain of an SPS of FIG. 1.

FIG. 5 shows a preferred ordering of objects 52 within a chain 50 which is designed to play sound. Although the sound objects perform relatively different functions in the chain, each shares a common interface and calling conventions.

As shown in FIG. 5, a sound source object 160 is coupled to a decompressor 162, so as to be the source for the decompressor. The decompressor is further coupled to a sample rate converter 164 as its source. The sample rate converter 164 is further coupled as a source to a mixer 166 which is further coupled as a source to a sound hardware object 168. The sound hardware object 168 is further linked to and interfaces with the sound hardware 40, sewing as the source for the sound hardware.

The arrangement shown in FIG. 5 is preferable because it is desirable to decompress a sound resource before changing its sample rate. Moreover, it is desirable to change the rate of the sound resource prior to mixing the resource with other sound resources to be played because a mixer typically operates on homogenous samples, i.e. samples which have the same characteristics.

The chain in FIG. 5 preferably includes a sound format converter (not shown) between any two objects in the chain where a sound object expects data in a format which is different from the format produced by the source of that sound object.

A sound source object 160 communicates directly with an application and receives data, e.g. sound resources, from that application.

A decompressor 162 converts sound resources received from its source which are compressed into uncompressed sound resources. Typically, the decompressor uses information stored in or associated with a sound resource to determine whether to decompress that sound resource and, if so, which decompression algorithm to use.

A sample rate converter 164 converts, if appropriate, the sample rate of sound resources received from its source so that the sample rate conforms with the sample rate specifications or requirements of the sound hardware. The sample rate converter typically determines the sample rate of a sound resource by examining information within the sound resource. The sound object for which the rate converter is a source specifies to the sample rate converter the expected sample rate. The rate converter compares these two values and if they are different converts the sound resource into the expected sample rate. For example, if a sound resource has an 11 kHz sample rate and the expected sample rate is 22 kHz, for each byte of inputted data, the sample rate converter duplicates the byte to form two bytes which are then outputted.

A mixer 166 manages multiple source inputs, i.e. channels. It preferably controls the construction and removal of the sound object chains to process digital audio data from a given application into a format that can be handled by particular sound hardware. The mixer preferably assigns a chain identification for each chain. To play sound, preferably, the mixer feeds its output directly to the sound hardware object 168, which sends the data to its associated sound hardware.

In addition, the mixer 166 can, preferably, control the volume and stereo panning of a given audio component chain 50 and can mix multiple audio sources into a single audio data stream, in both monophonic or stereo output. The SPS also provides a mechanism for overriding the functions provided by the mixer 166. For example, a sound hardware object 168 can support more audio control over the data, such as volume and mixing, by requesting that the mixer 166 not perform those particular functions. The mixer is still present to set up the sound object chain and to assign a chain identification to each chain.

A variety of methods can be used by the mixer 166 to mix multiple audio channels into a single audio data stream. Preferably, the mixer uses a mechanism described in a concurrently-filed and commonly-assigned patent application entitled "Method and Apparatus for Mixing Multiple Channels of Sampled Digital Audio Using A Non-Linear Clipping Function", the disclosure of which is herein incorporated by reference.

In an embodiment of the invention where the mixing is being handled by the sound hardware, a mixer is preferably included in a chain for that sound hardware to handle creation and removal of chains and assignment of chain identifications. Alternatively, if an embodiment of the SPS includes a mechanism other than a mixer, for creating and controlling chains within the SPS, then a mixer need not be included and sound objects other than mixers can have multiple input channels. However, it is preferable to use mixers to create and manipulate chains so as to maintain the separation of functions which allows objects other than sound hardware objects to be virtually sound hardware-independent.

A sound hardware object 168 links the other objects in the SPS with the sound hardware. Typically, an application communicates with object in a chain via the sound hardware object of the chain and the message is propagated along the chain toward the sound source object until it reaches the proper sound object. If a chain does not include a sound hardware object, then an application typically communicates with sound objects on the chain via the sound object which is positioned at the opposite end of the chain than the sound source object.

If the sound hardware is limited in functionality, then the sound hardware object need only support a subset of sound object functions. However, if the sound hardware is highly capable, e.g. a DSP, then the sound hardware object preferably supports more functionality. A computer 30 (FIG. 1) may include more than one sound hardware 40. In that case, each sound hardware 40 has an associated sound hardware object. Preferably, the SPS permits sound hardware objects to be written for any sound hardware and provides a mechanism for incorporating the sound hardware objects into the SPS.

A sound hardware object typically transfers data to a sound hardware by writing the data to a buffer of the sound hardware. A sound hardware object can also write the data to a second buffer, such as RAM or disk, to save the sound resource for later use.

Since only the sound hardware object communicates directly with the sound hardware, the other sound objects are insulated from device-dependent considerations and simply operate on a stream of bytes without sound hardware-specific "knowledge".

Figure 6:
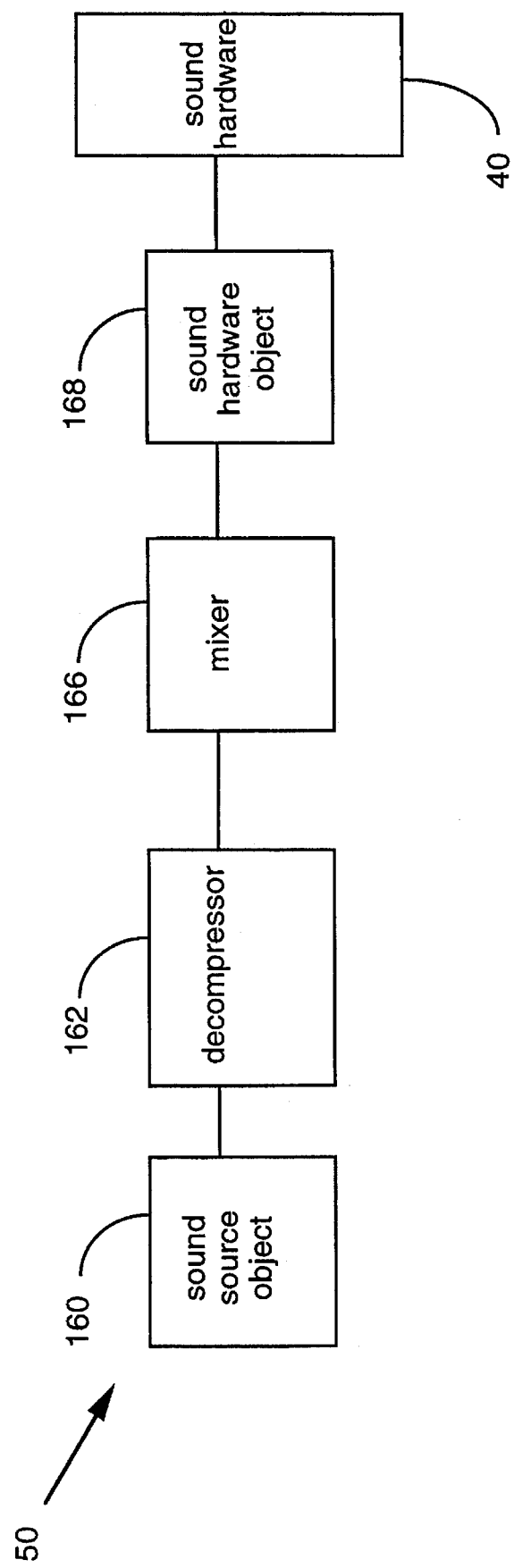
FIG. 6 shows a chain of FIG. 5 where the sound hardware, rather than a sample rate converter, handles the sample rate conversion of audio signals.

As briefly mentioned with respect to the mixer 166, a chain 50 can be modified to take advantage of advanced or future functionality provided by the sound hardware. FIG. 6 shows a preferred construction for a chain 50 depicted in FIG. 5 when the sound hardware includes sample rate conversion functionality which is equal to or superior to the sample rate conversion technology in the SPS. Note that a sample rate converter is not included in the chain. Thus, the sample rate conversion is performed by the sound hardware, not the SPS.

Figure 7:
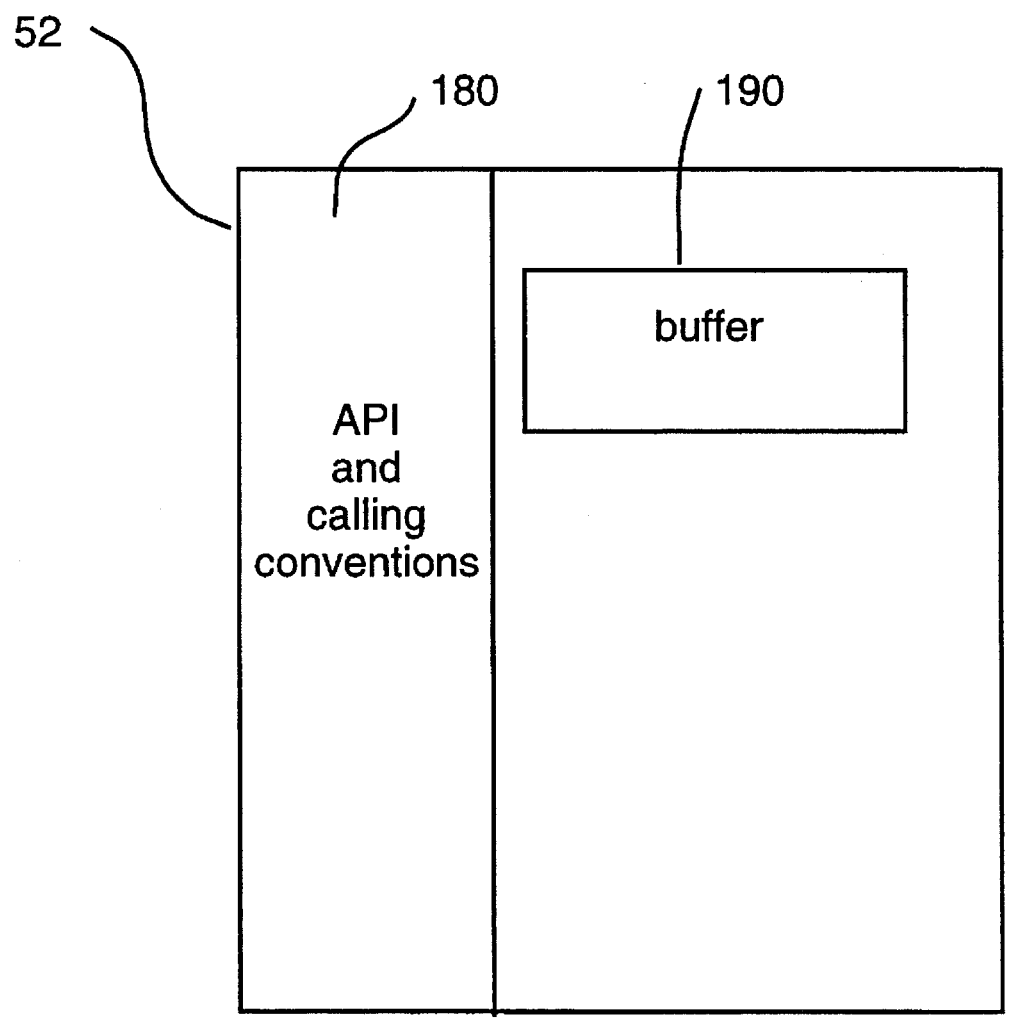
FIG. 7 illustrates generally features which are common to sound objects in an SPS of FIG. 1.

FIG. 7 shows features common to sound objects 52 in the SPS 48. Each sound object 52 uses substantially the same API and calling conventions. Moreover, each sound object 52 encapsulates a buffer 190 for storing data.

Figure 8A:
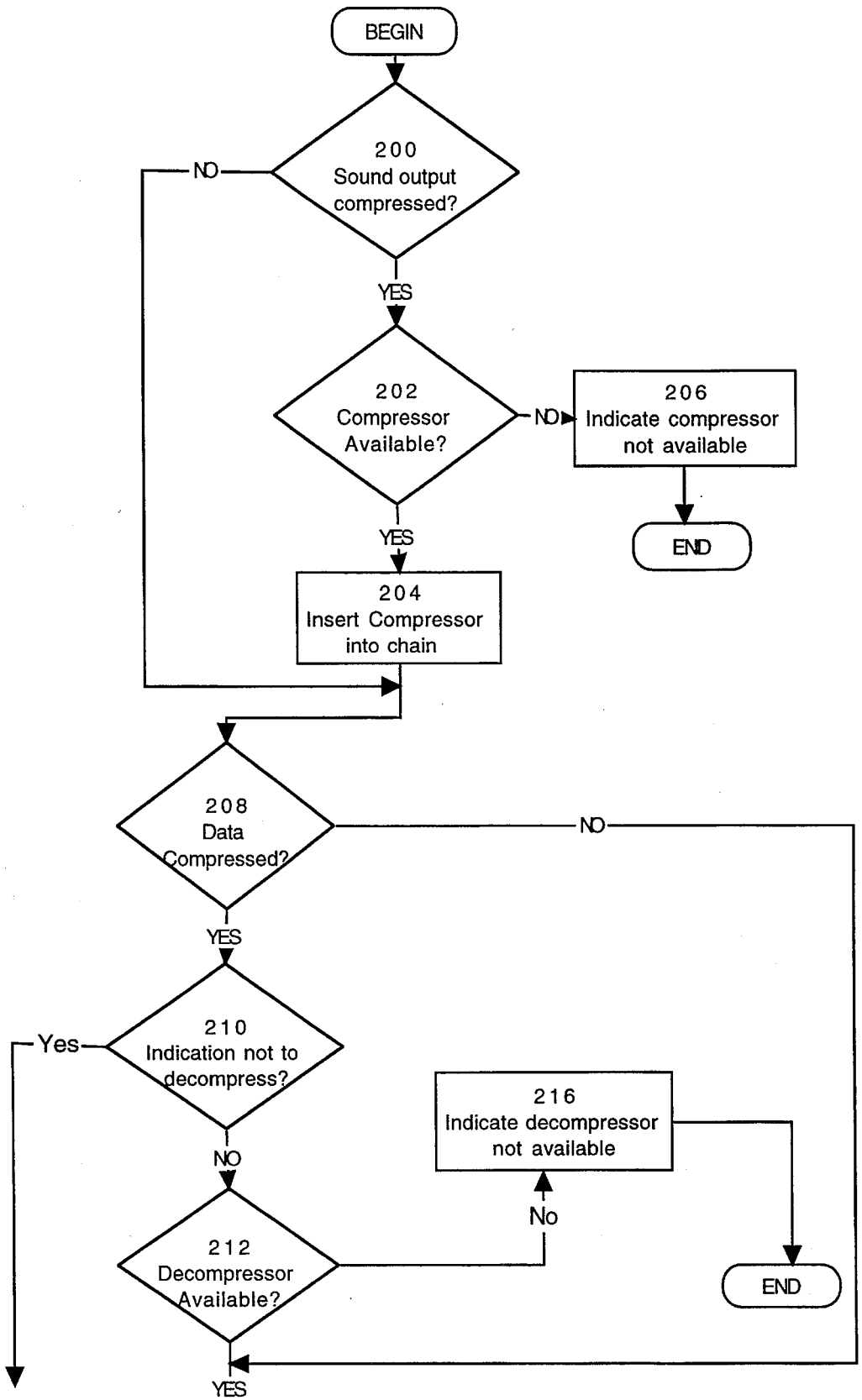
FIGS. 8A and 8B is a flowchart generally illustrating the steps performed to create chains in an SPS of FIG. 1.
Figure 8B:
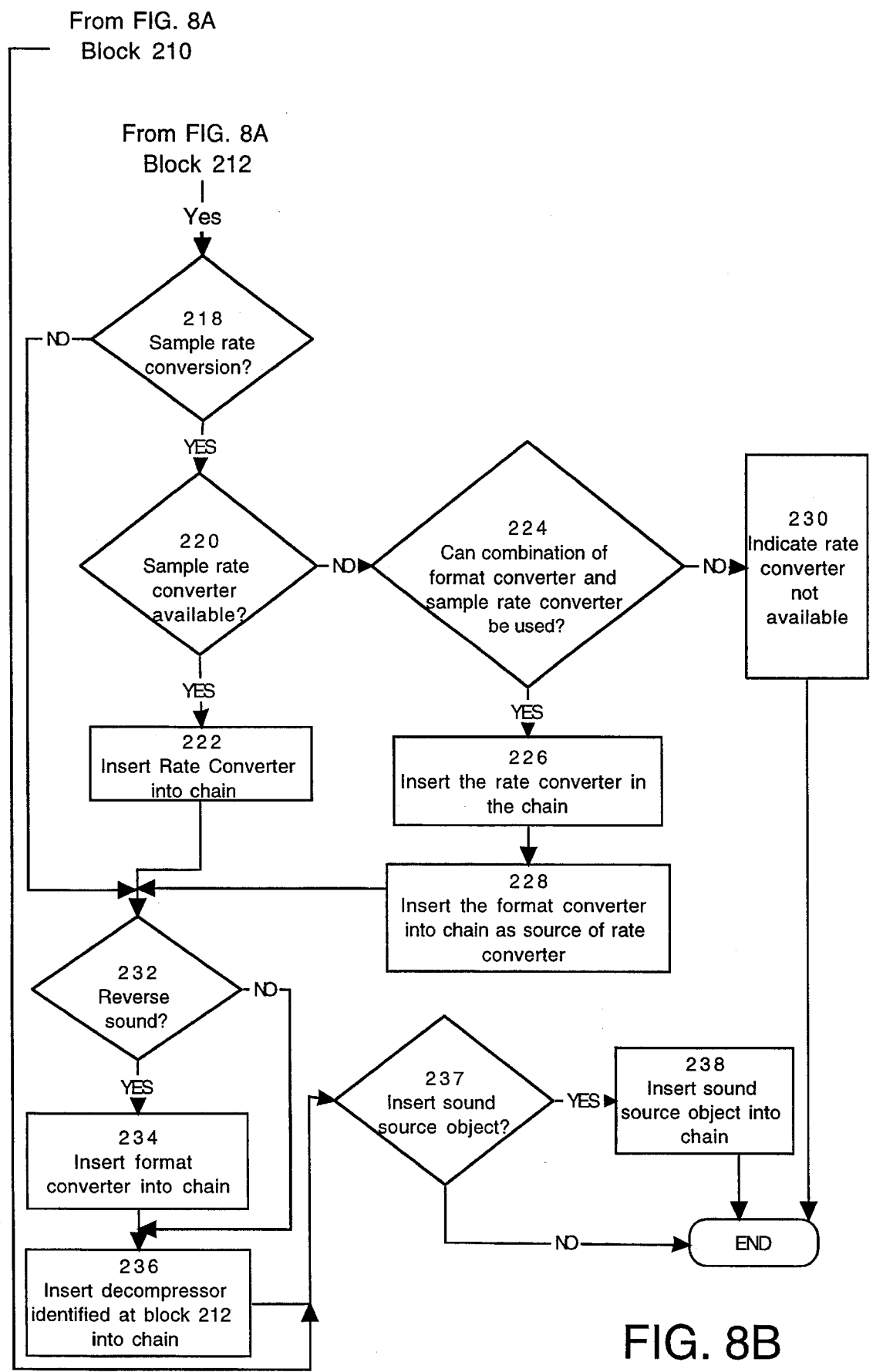

FIGS. 8A and 8B are flowcharts showing how a chain for producing sound is formed. To play a sound a mixer and a sound hardware object can be added to a chain resulting from the steps performed in FIGS. 8A and 8B. The steps in FIGS. 8A and 8B are preferably invoked by a mixer or by a software application. Preferably, the format of the data being processed by the chain the format of the output to be produced and a list of actions are specified as input to the steps performed in FIGS. 8A and 8B. The list of actions specifies which operations the chain is to perform on the data it processes. Among other operations, the list of actions specifies whether to decompress the input, sample rate convert the input, reverse the input, convert the number of channels, insert a sound source object in the chain and/or convert the sample size of the input. The format of the data specified includes, among other information, whether the data is compressed, and if so, the type of compression, the sample rate and whether to reverse the sound. The format of the output specified includes, among other information, the sample rate and whether the output is compressed, and if so, the type of compression.

With regards to FIG. 8A, at block 200, it is determined whether the sound output produced by the chain is to be in a compressed format. If the sound output is to be in a compressed format then at block 202 it is determined whether a compressor is available which is capable of producing an output in the compressed format specified. If a compressor is available to handle the specified compression format, then at block 204, the compressor is inserted into the chain and control passes to block 208. If a compressor is not available, then at block 206 an indication is returned, e.g. error, preferably specifying that a compressor is not available. If at block 200, the sound output is not compressed, then control passes directly to block 208.

At block 208, if the data to be processed by the chain is in a compressed format, then at block 210 it is determined whether to decompress the data. If the data is to be decompressed then at block 212 it is determined whether a decompressor exists which can decompress data having the specified compression type. If at block 212, there is a decompressor, then control passes to block 218. If at block 212, there is not a decompressor available for that particular compression type, then at block 216 an indication is returned, e.g. error, preferably specifying that a decompressor is not available. If at block 212 it is determined that the data is to remain compressed, then at block 237 (FIG. 8B) it is determined whether to insert a sound source object. If so, at block 238 (FIG. 8B) a sound source object is inserted into the chain.

With regards to FIG. 8B, at block 218, it is determined whether the chain is to perform sample rate conversion. This determination is typically made by comparing the sample rate of the data being processed by the chain to the sample rate of the output. If they specify the same sample rate then control passes to block 232. If they specify different sample rates, then at block 220, it is determined whether a sample rate converter which converts data from the sample rate of the data being processed to the sample rate of the output is available. If so, then at block 222 the sample rate converter is inserted into the chain. If not, then at block 224 it is determined whether a combination of an available sample rate converter and an available format converter can convert data from the sample rate of the data being processed to the sample rate of the output. If so, then at block 226, the sample rate converter of the combination is inserted into the chain and at block 228, the format converter of the combination is inserted into the chain as the source of the rate converter. If not, then at block 230 an indication is returned, e.g. error, preferably specifying that a sample rate converter is not available.

At block 232, it is determined whether to reverse the data being processed. If so, then at block 234 the format converter is inserted into the chain and control passes to block 236. If not then control passes to block 236.

At block 236, the decompressor specified at block 212 (FIG. 8A) is inserted into the chain. At block 237, it is determined whether to insert a sound source object. If so, then at block 238 a sound source object is inserted into the chain.

Figure 9:
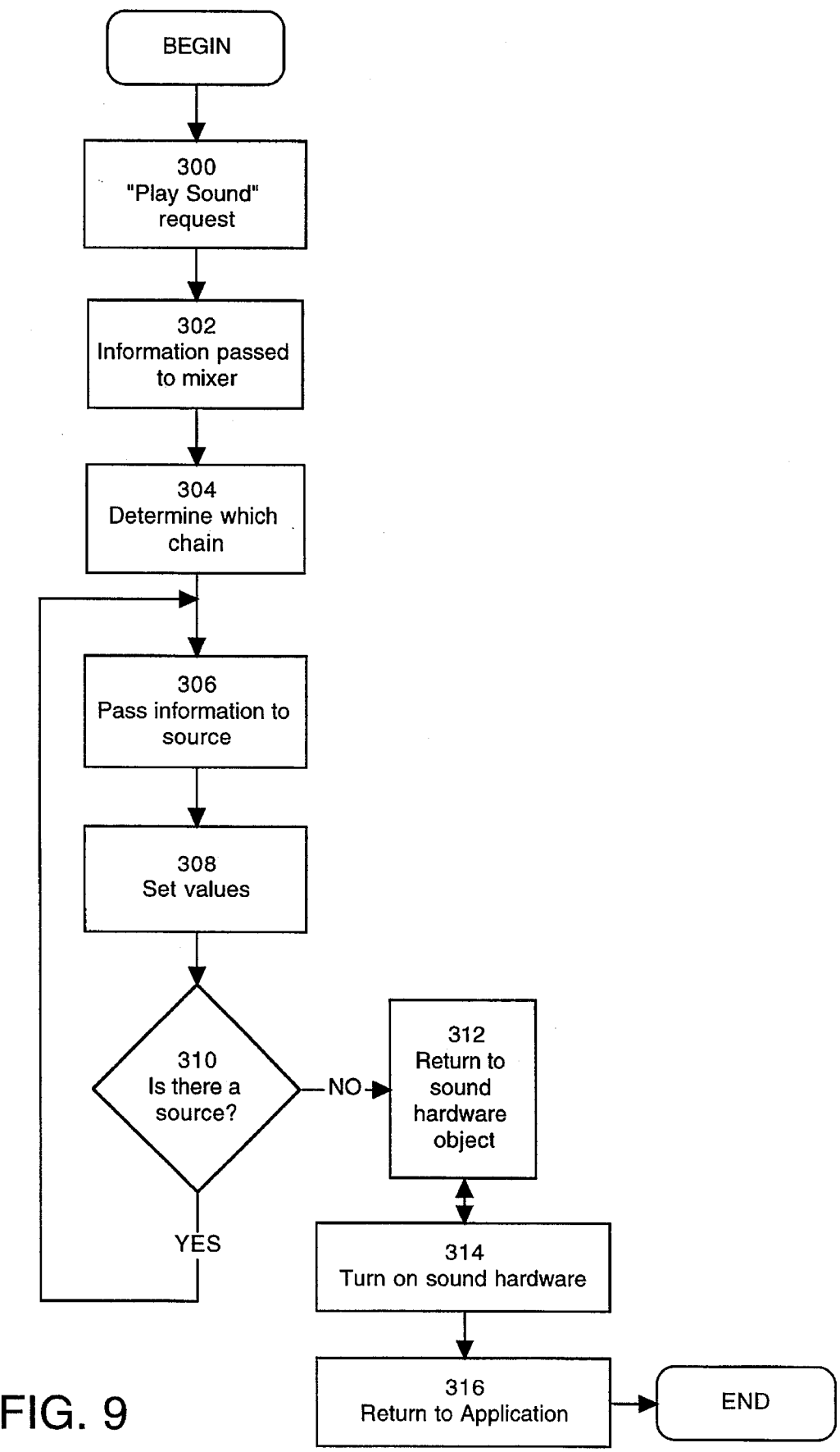
FIG. 9 is a flowchart generally illustrating the intializing steps performed in response to a request from an application to play sound.
Figure 10:
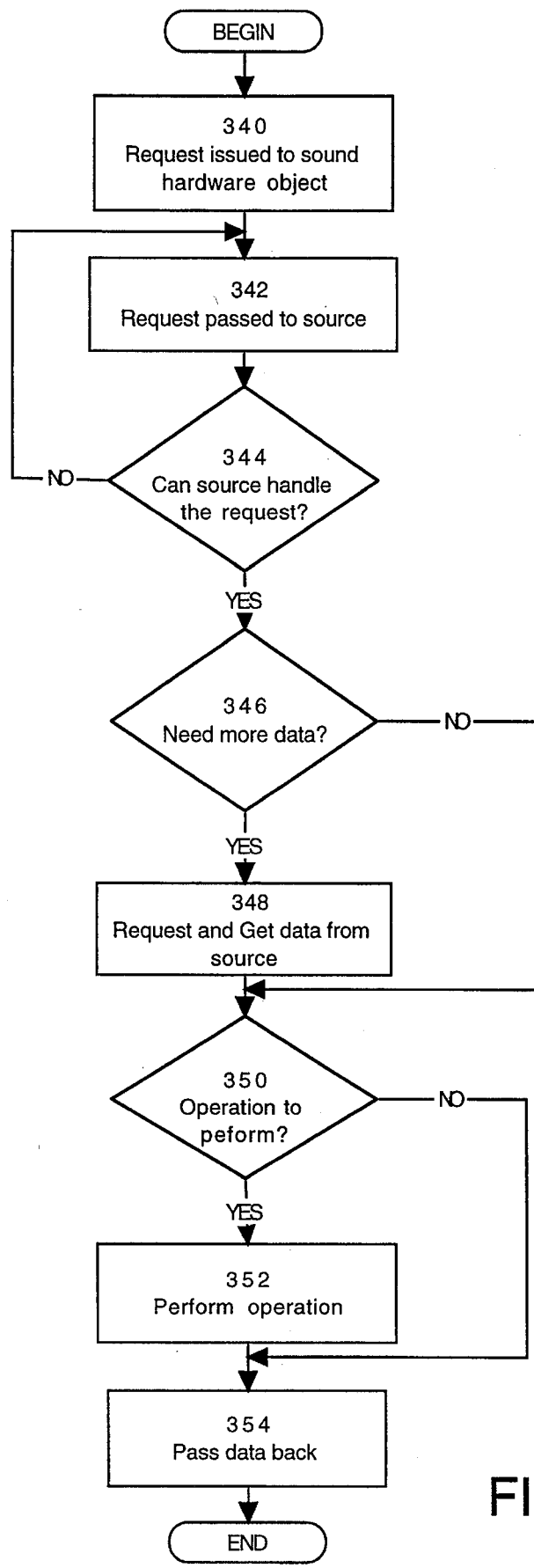
FIG. 10 is a flowchart generally showing the steps performed in response to a request for more data, as well as other types of requests.
Figure 11:
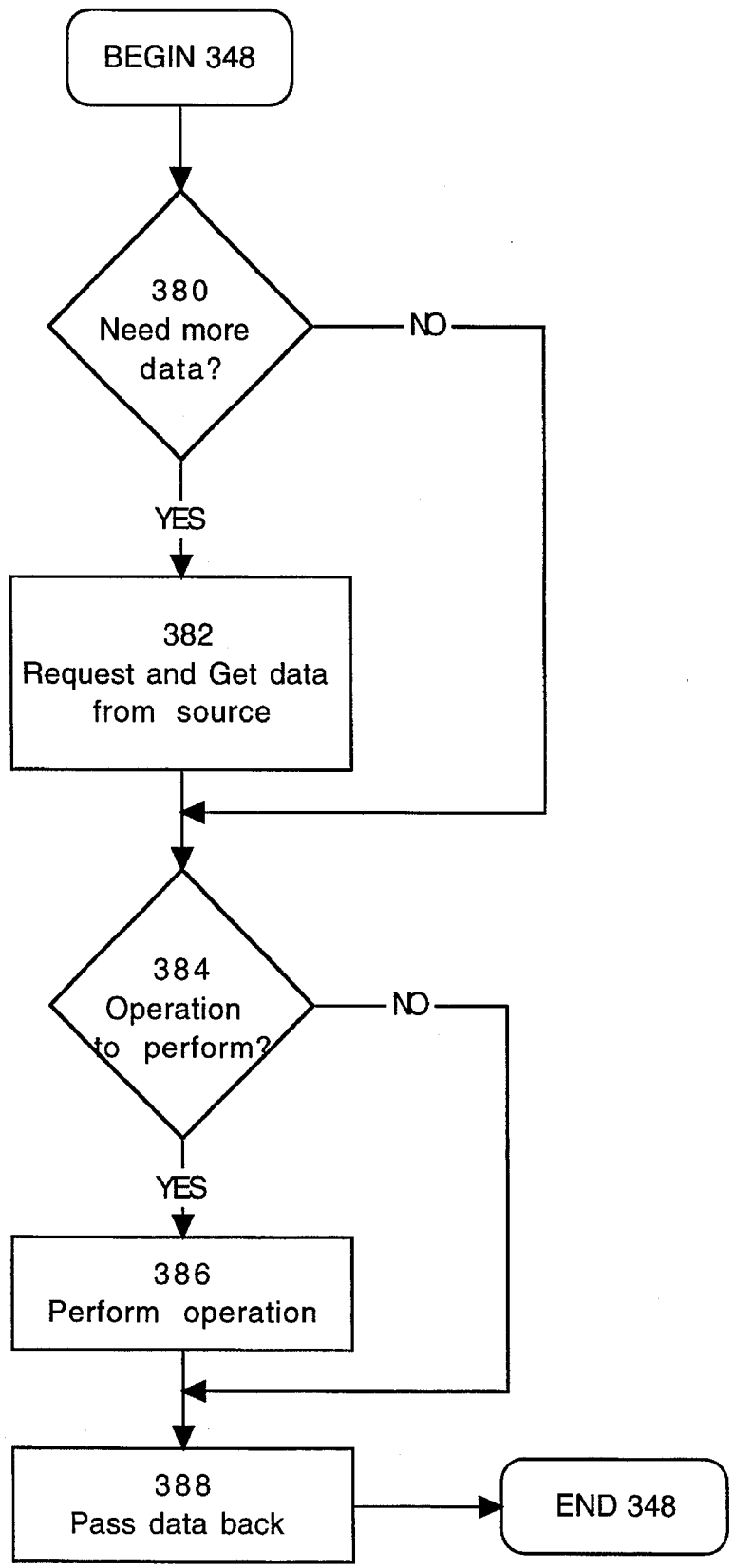
FIG. 11 is a flowchart showing the steps performed at block 348 of FIG. 10.

FIGS. 9–11 are flowcharts generally depicting the steps performed to play a sound in a chain 50, typically in response to a request from a software application. FIG. 9 shows the steps which are performed to prepare the sound objects in the chain, as well as the sound hardware, for playing a sound. FIGS. 10–11 show the steps which are performed to actually play the sound. Typically, after execution of the steps in FIG. 9, control returns to the application and the steps in FIGS. 10 and 11 are performed asynchronously by the sound hardware and the SPS.

As shown in FIG. 9, at block 300 a software application issues a request to play sound to a sound hardware object. The sound hardware object passes this request to its source, typically a mixer. The source examines information in the request at block 303 and sets values within its own data structures appropriately. For example, the source data's format, sample rate and compression type. A mixer uses the information to create a proper set of objects in a chain, e.g. a proper decompressor or format converter.

The source, e.g. mixer, determines at block 304 which chain to use to satisfy the request to play sound. Preferably, the mixer makes this determination by examining a chain identification identified in the request to play sound. If the creation and manipulation of chains is handled by a separate mechanism, then the determination at block 304 is performed by that separate mechanism, as appropriate.

At blocks 306 to 310, the request gets passed along the chain identified in block 304 so that each sound object in the chain is apprised of the request and can set appropriate values based on information in the request. After each of the sound objects in the identified chain have been apprised of the request, at block 312, control is propagated along the chain until it returns to the sound hardware object. At block 314, the sound hardware object turns on the sound hardware. In an interrupt-driven system, this typically entails enabling interrupts. At block 316, control returns to the software application which issued the request.

The sound hardware and SPS run asynchronously with the software application and are typically triggered by interrupts, at least in an interrupt-driven environment, to play sound, perform some other operation or satisfy a query. The steps performed in response to such an interrupt are shown in FIG. 10.

At block 340 an interrupt or other mechanism-driven request is issued to the sound hardware object to send data to the hardware for it to be played. The request is passed to the source of the sound hardware object, typically a mixer, at block 342. At decision block 344, the source of the sound hardware object determines whether the request is of a type which it can handle. For example, if the request is for data, then a mixer can handle that request, even though it might need to get data from other sound objects before it can actually satisfy the request. On the other hand, if the request is a query as to a characteristic related to the sample rate converter, then the mixer may determine that it can not handle that type of request and pass the request along the chain.

If it can satisfy the request, then control continues at decision block 346; otherwise, control continues at block 345 where it is determined whether the source of the sound hardware object has a source of its own. If so, then at block 342 the source of the sound hardware object passes the request to its own source which then determines whether it can handle the request. If not, then at block 347 an indication that the request can not be satisfied is propagated along the chain and returned to the application which issued the request.

Typically, if a request is propagated along the chain until it reaches a sound source object and the request is for more data, then if the sound source object can not retrieve data from the application, e.g. the application indicates that there is no more data, then an indication that there is no more data is propagated along the chain to the sound hardware object and returned to the application, effectively stopping the playing of sound.

Blocks 342 and 344 are repeatedly executed to pass the request along the chain until either a sound object is found which can handle the request or until the end of the chain is reached.

At decision block 346, the sound object, i.e. the first sound object in the chain to determine at block 344 that it could handle the request, determines whether it needs data from its source in order to satisfy the request. For example, if the mixer has access to 256 bytes of data, but the request is for 512 bytes, then the mixer needs to get more data from its source. If the sound object needs more data, then it requests and gets the data from its source at block 348.

At block 350, the sound object determines whether to perform its specific operation on the data and at block 352 it performs the operation, if appropriate. For example, at block 350, a sample rate converter compares the sample rate of the data to the expected sample rate and determines whether to perform a sample rate conversion. If the determination is affirmative, then the conversion is performed at block 352. At block 354, the data is passed along the chain and ultimately passed to the sound hardware and played at block 356.

FIG. 11 is a more detailed flowchart of the steps performed at block 348 of FIG. 10. When a source is asked for data it first determines whether it needs more data from its own source at block 380. If so, then it requests and gets data from its own source at block 382, where block 382 is essentially the same as block 348 of FIG. 10. If the source does not need more data, then at decision block 384, it determines whether to perform its specific operation on the data and, if so, then it performs that operation at block 386. At block 388, the data is passed along the chain to the sound object which issued the request for data from the source. Blocks 384, 386 and 388 are similar to blocks 350, 352 and 354 of FIG. 10.

Figure 12:
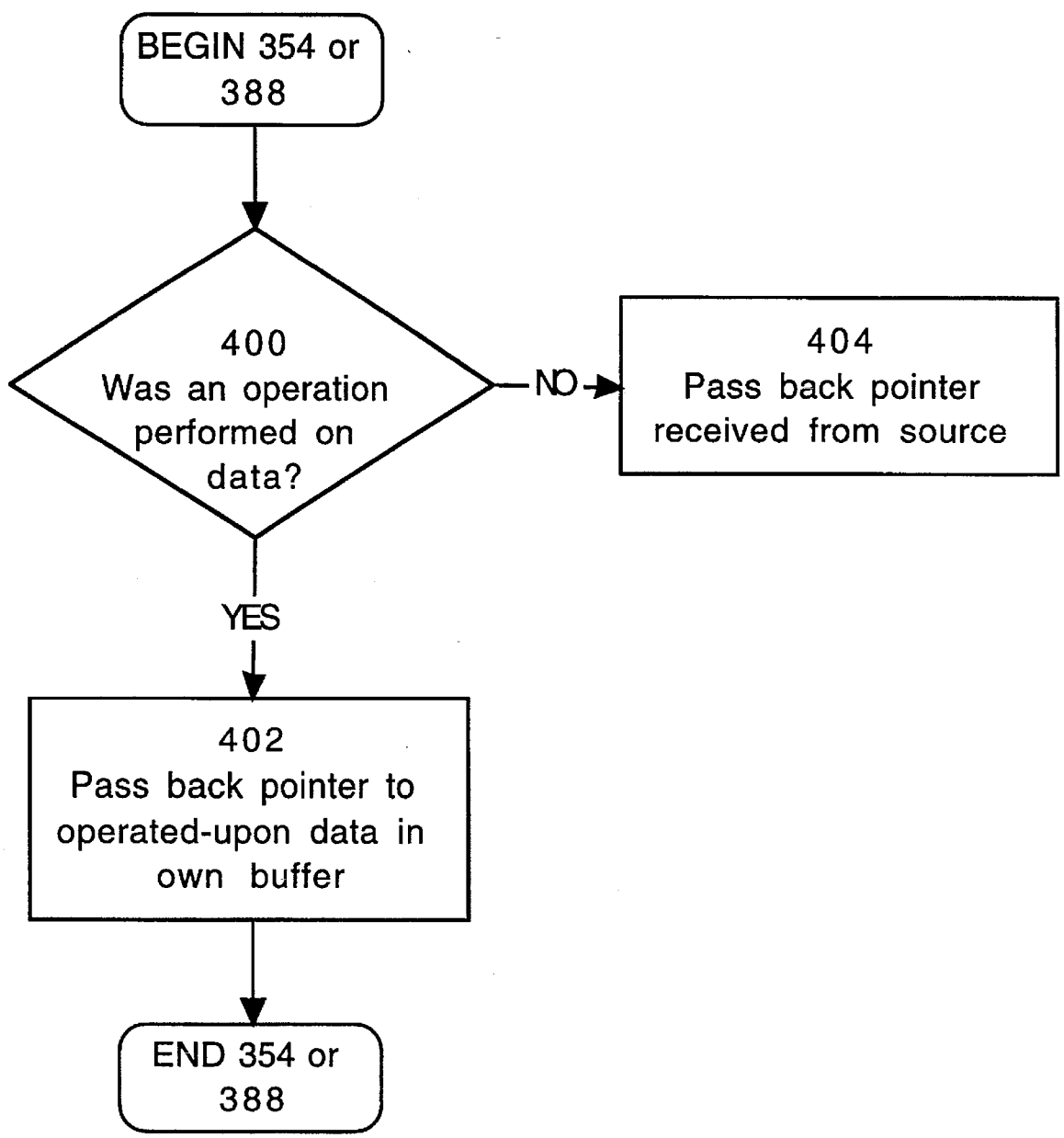
FIG. 12 is a flowchart illustrating the steps performed in an optimization that preferably occurs at block 354 of FIG. 10 and at block 388 of FIG. 11.

FIG. 12 illustrates an optimization that preferably occurs at block 354 of FIG. 10 and at block 388 of FIG. 11. If the sound object performed any operation on the data, then at block 402 it passes along a pointer to its own buffer where the operated-upon data resides. However, if the sound object did not perform any operation on the data, but is acting as merely a conduit, then at block 404 the sound object passes along the pointer it received from its source. That pointer points to a buffer in its source or in a sound object preceding the source in the chain.

For example, in a chain as shown in FIG. 5, if a sound resource retrieved by the sound source object 160 is uncompressed and is at the same sample rate as that expected by the sound hardware, then the sound source object 160 passes a pointer to its own buffer to the decompressor 162. Since the sound resource is uncompressed, the decompressor 162 does not perform any operation and passes a pointer to the buffer of the sound source object 160 to the sample rate converter 164. Since the sample rate of the sound resource is the same as the expected sample rate of the sound hardware, the sample rate converter 164 does not perform any operation and passes a pointer to the buffer of the sound source object 160 to the mixer 166. In this case, since the mixer 166 is receiving only a single input, it might not perform any operation on the data, and in that case it passes a pointer to the buffer of the sound source object 160 to the sound hardware object 168. If the mixer 166 does perform an operation on the sound resource, it passes a pointer to its own internal buffer which contains the operated-upon sound resource. This optimization provides efficiencies in processing time when a sound object does not perform any operation on the data because is it typically faster to pass a pointer to data in an existing buffer, rather than copying the data to a new buffer and then passing a pointer to than new buffer.

Figure 13:
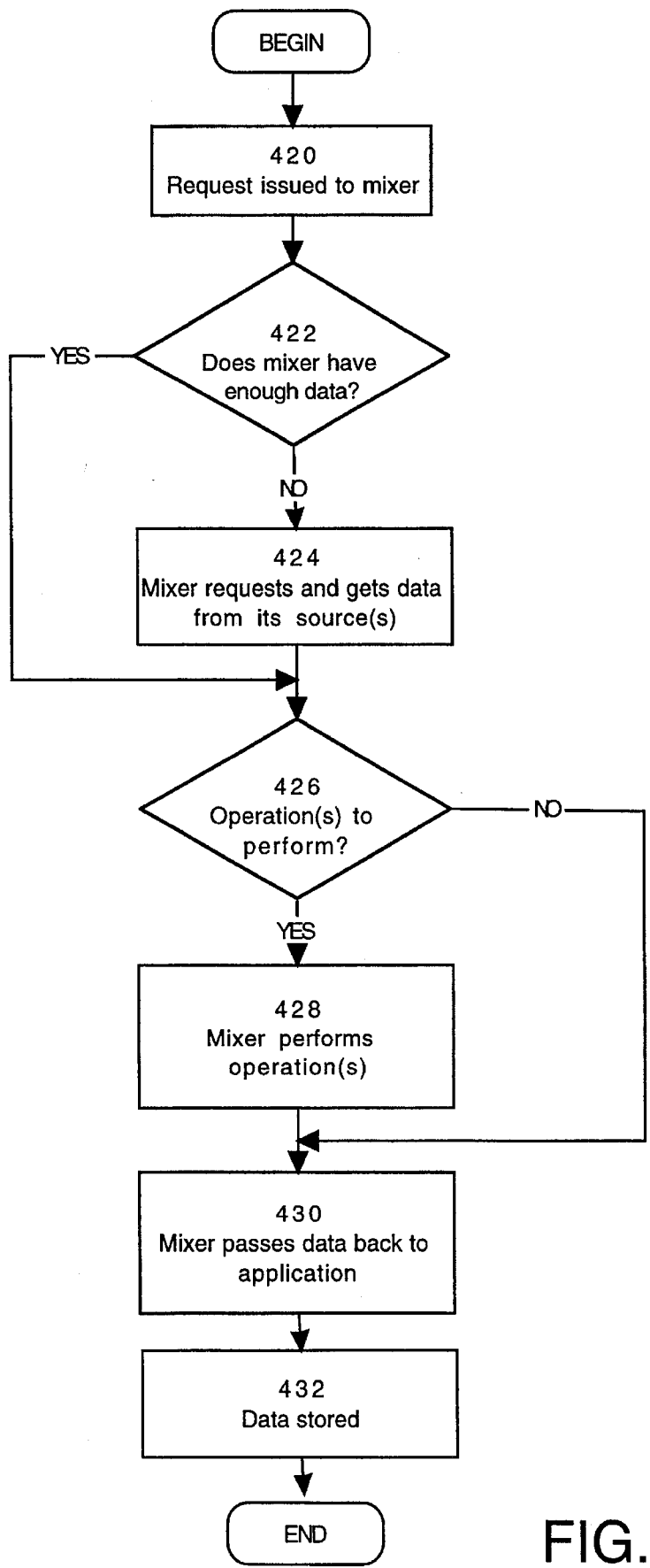
FIG. 13 is a flowchart generally depicting the steps involved in mixing multiple channels of audio signals into a single data stream which is stored for later use.

FIG. 13 shows the steps involved in mixing multiple channels of audio signals into a single data stream and then storing that single data stream in a storage medium such as memory or disk, for example. At block 420, a request to for mixed audio signals, i.e. mixed sound resources, is issued to a mixer. At block 422, the mixer determines whether it has enough data to satisfy the request. If not, then at block 424 the mixer requests and gets data from its source(s). When the mixer has enough data to satisfy the request, the mixer determines at block 426 whether to perform any operation(s) on the data. If so, then at block 428, the mixer performs the operation(s) on the data. At block 430, the data is passed along to the application and stored at block 432. The optimization previously-described in relation to FIG. 12 is preferably used at block 430.

Sound objects and the SPS use a common set of API's to intercommunicate and to communicate with the underlying object-oriented dynamic binding mechanism 44 (FIG. 1). Appendix A provides a header file written in a C programming language containing declarations for data structures, API's and constants which can be used in an implementation of an SPS incorporating the invention on a computer running the Apple Macintosh operating system, version 7.1, including the Component Manager 1.0, as previously referenced, herein called a "Component Manager implementation" of the SPS, abbreviated "CMI". As previously discussed, the invention is applicable to an SPS implemented on other platforms as well.

In CMI, a sound object is typically represented using a ComponentResource as defined by the Component Manager. Below is the definition for a ComponentResource written in the C programming language:

```
struct ComponentResource            {
    ComponentDescription            cd;
    ResourceSpec                    component;
    ResourceSpec                    componentName;
    ResourceSpec                    componentInfo;
    ResourceSpec                    componentIcon;
};
```

A ResourceSpec data type typically has the following structure:

```
typedef struct {
    OSType      resType;
    short       resID;
} ResourceSpec;
```

The component field of the ComponentResource specifies the resource type and the resource identification of the sound object's executable code. Preferably this field is set to a value which indicates that it is a sound object.

The componentName field of the ComponentResource specifies the resource type and resource identification of the resource that contains the sound object's name.

The componentInfo field of the ComponentResource specifies the resource type and resource identification of the resource that contains a description of the sound object.

The componentIcon field of the ComponentResource specifies the resource type and resource identification of the resource that contains an icon for the sound object.

The cd field of the ComponentResource is a component description record which contains additional information about the sound object and typically has a data structure as follows:

```
typedef struct {
    OSType          componentType;
    OSType          componentSubType;
    OSType          componentManufacturer;
    unsigned long   componentFlags;
    unsigned long   componentFlagsMask;
} ComponentDescription
```

For sound objects, the componentType field is set to a value recognized by the SPS and the componentSubType field is set to a value that indicates the type of audio services provided by the sound object, possible values for each field being shown in Appendix A.

The componentFlags field of the component description for a sound object typically contains bit flags that encode information about that sound object. Such information can include, but is not limited to, the kind of audio data it can accept as input, the kind of audio data it can produce as output, the actions it can perform on the audio data it is passed, and the performance of the sound object.

For example, this field can be used to specify that a sound object should be registered with the SPS at system startup. Moreover, sound hardware objects can use this field to check for the presence of appropriate sound hardware to determine whether to register with the SPS. This field can also be used to define the characteristics of the sound object. For example, a bit in that field can be set to indicate that the sound object can accept stereo sound data.

Figure 14:
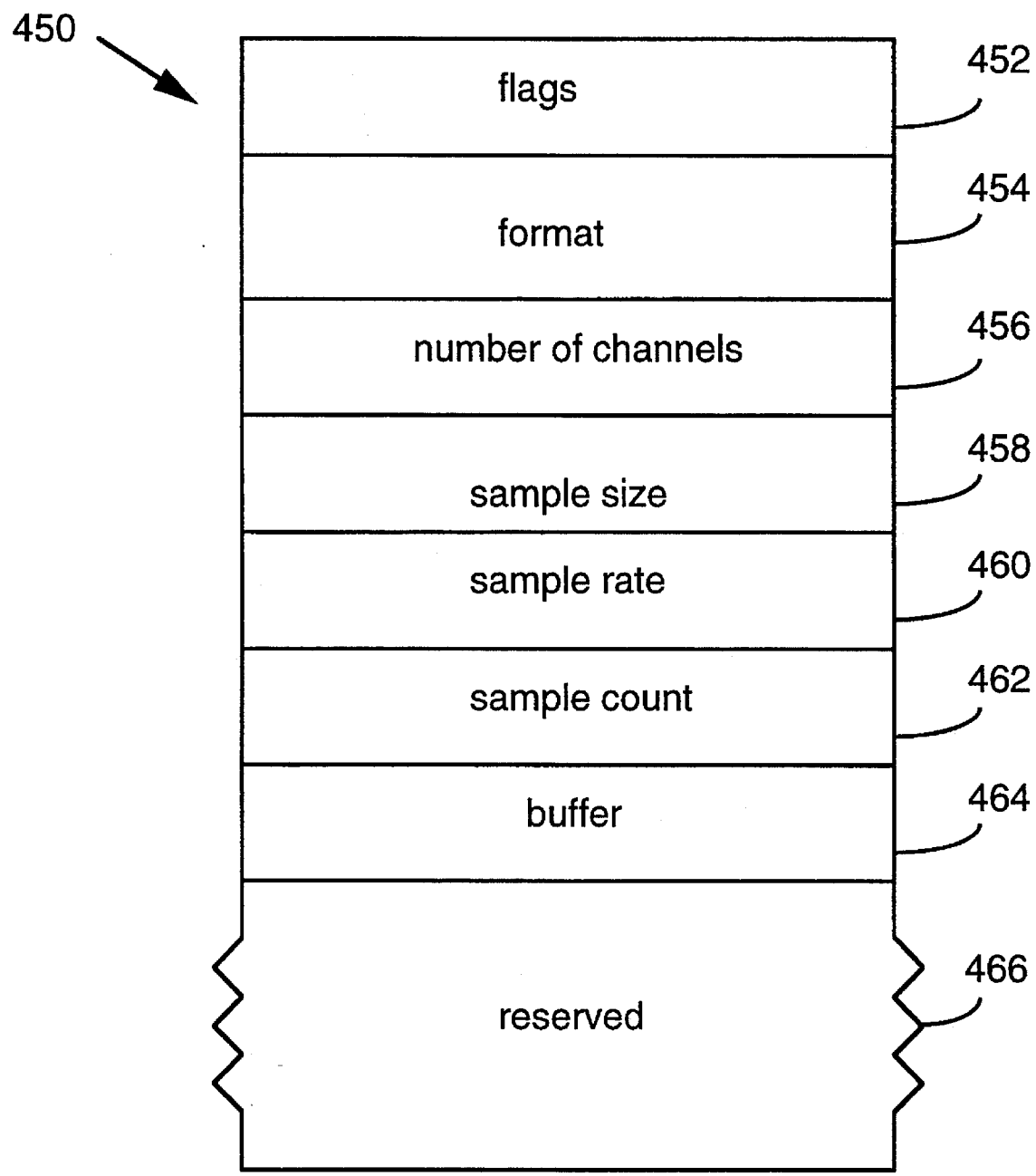
FIG. 14 shows a data structure for representing a sound resource.

In CMI, a sound resource 49 (FIG. 1) is typically represented using a data structure 450, herein called SoundComponentData, as shown in FIG. 14. The SoundComponentData 450 comprises a flag field 452, a format field 454, a number of channels field 456, a sample size field 458, a sample rate field 460, a sample count field 462, a buffer address field 464 and, optionally, a reserved field 466.

The flag field 452, also called a first field, indicates what actions should or should not be taken with respect to that sound resource by particular sound objects. For example, the flag field can be a bit field of actions, each of which is set to TRUE if that particular action should be taken. In that case, a sound object can examine the bits which are appropriate to that sound object and determine which operations to perform, i.e. a sample rate converter can check the bit for sample rate conversion to determine whether to perform rate conversion operations.

The format field 454, also called a second field, defines the format of the data produced by a sound object. It typically specifies whether the data is compressed and, if so, the compression algorithm used. For uncompressed data, this field typically specifies the format of that data, e.g. offset-binary or twos-complement. Appendix A shows some possible constants which can be defined for this field where the term MACE stands for the Macintosh Apple Compression and Expansion algorithm set forth in Drory, U.S. Pat. No. 5,083,310.

The number of channels field 456, also called a third field, specifies the number of audio channels in the output data stream, indicating if the data stream is mono, stereo, quadraphonic or some other audio format. For example, a value of one specified by field 466 preferably indicates that the data stream contains mono data only, while a value of two indicates that the data stream contains stereo data. Typically, stereo data is stored as interleaved samples, in a left/right, left/right order.

The sample size field 458, also called a fourth field, indicates the size of each sample in bits, typically 8 bit or 16 bit. For compressed sounds, this field typically indicates the size of the samples once the data has been expanded.

The sample rate field 460, also called a fifth field, specifies the sampling rate for the sound, preferably as an unsigned fixed-point number, thereby providing for sample rates in the range 0.0 to 65536.0 samples/second.

The sample count field 462, also called a sixth field, specifies the number of samples in the sound.

The buffer field 464, also called a seventh field, indicates the address where the samples are located. The buffer is typically located in RAM 34 (FIG. 1). Typically the address at which the samples begin is indicated in the buffer field 464.

The reserved field 466 is optional and reserves space in the SoundComponentData for adding future fields to the data structure. The SoundComponentData structure is preferably used to access information to build a chain as described in conjunction with FIGS. 8A and 8B.

In CMI, a sound parameter block, referenced as "SoundParamBlock" in Appendix A, is used when playing asynchronous sounds. The sound parameter block supplies information about the format, location and sound playback options of a sound to be played. For example, among other information, the sound parameter block specifies a rate multiplier, if any, to be applied to the playback rate of the sound, as well as the volume and quality at which the sound is to be played.

Figure 15:
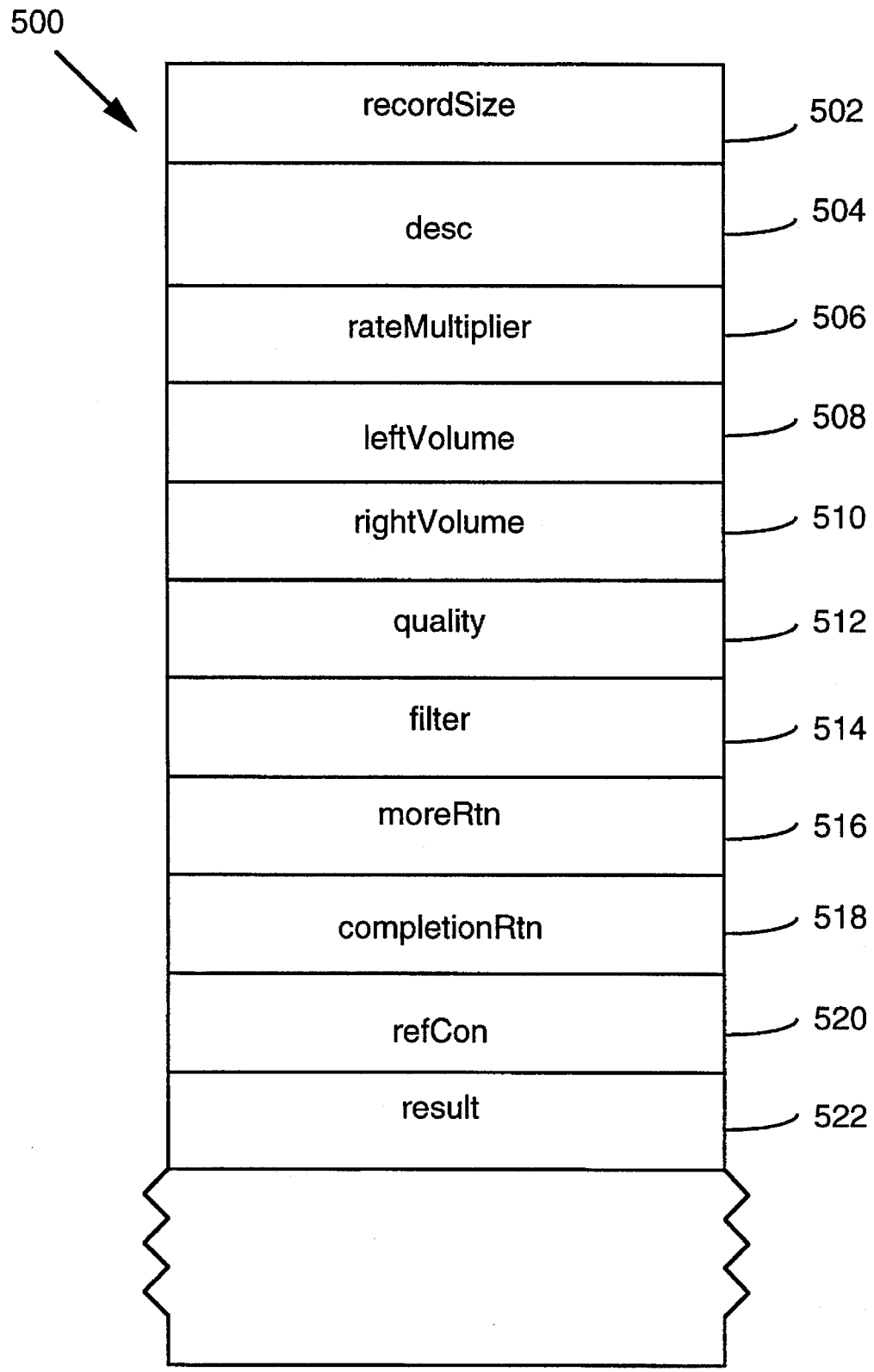
FIG. 15 shows a data structure used for playing asynchronous sounds.

When a request is issued by an application to play sound as described with reference to FIG. 9, a reference to a sound parameter block 500 is generally included. The information stored in the sound parameter block 500 is used by the sound objects in the chain to set values as appropriate at blocks 303 and 308 of FIG. 9. As shown in FIG. 15 the sound parameter block 500 contains SoundComponentData, as well as other descriptive information about the sound to be played.

The recordSize field 502 specifies the length of the sound parameter block 500 in bytes. This provides for future expansion of the sound parameter block 502 by allowing additional fields to be added at the end of the currently defined fields.

The desc field 504 contains SoundComponentData which describes the format, size and location of the sound to be played.

The rateMultiplier field 506 indicates the multiplier to be applied to the playback rate of the sound as an unsigned fixed-point number. For example, if the rate multiplier was 2.0, the sound would play back at twice the normal rate specified in the sample rate field 460 (FIG. 14) of the SoundComponentData.

The leftVolume and rightVolume fields 508 specify the playback volume for the sound and can be used to independently control the left and right channels. This can be for example an unsigned 16-bit fixed-point number where full volume is specified by a value of 1.0 (0×0100) and silence is specified by a value of 0.0 (0×0000). The volume of a sound can be overdriven by specifying a volume setting greater than 1.0, although this may result in clipping of the sound.

The quality field 510 specifies the level of quality of desired for the sound. This typically determines how much processing should be applied during such steps as rate conversion and decompression to increase the output quality of the sound. Typically, as the amount of processing increases, so too does the cost of increased processor overhead. Preferably, the quality field is a two-bit field having a first bit for specifying the type of quality and a second bit for specifying whether to provide the quality specified by the first bit in real-time or non real-time. For example, when bit 0 of the quality field is TRUE, it specifies that a best quality be produced and when bit 0 is FALSE, it specifies that the quality which is fastest to produce be used. When bit 1 of the quality field is TRUE, it specifies non real-time, while a value of FALSE specifies real-time.

The filter field 512 specifies additional sound objects to apply the sound. Such additional sound objects include, but are not limited to, sound objects which echo the sound and sound objects which reverberate the sound.

The moreRtn field 514 specifies a pointer to a routine to call when another buffer just like the previous buffer of sound played is desired. This allows seamless playback of continuous sounds. The format of the more routine is as follows:

pascal Boolean MoreSound(SoundParamBlockPtr *pb);

A pointer to the current sound parameter block is passed in. If another block of data just like the one described in this parameter block can be returned, the sampleCount and buffer fields of the SoundComponentData in the parameter block are updated and a result of true is returned. If another buffer is not available, the parameter is not changed and a false result is returned. If the moreRtn field is set to nil, then the routine will not be called. The parameter is a pointer variable, so that the called function may return a pointer to an entirely new sound parameter block.

The completionRtn field 516 specifies a pointer to a routine to call when a sound has finished playing. The format of the completion routine is as follows:

pascal Boolean SoundComplete( SoundParamBlockPtr *pb);

A pointer to the current sound parameter block is passed in. If another sound of any type is ready to play, any or all fields of the parameter block can be updated and a result of true is returned, and the new sound will be started. If another buffer is not available, the parameter block is not changed and a false result is returned. If the completionRtn field is set to nil, then the routine will not be called. The parameter is a pointer variable, so that the called function may return a pointer to an entirely new sound parameter block.

The refCon field 518 specifies a user-defined value to be passed to the MoreSound and SoundComplete routines to allow applications to gain access to global variables or structures.

The result field 520 specifies the status of the sound that is playing. For example, a value of 1 can mean the sound is in progress, a value of 0 can mean the sound has completed playing and a negative value can indicate an error has occurred.

The CMI, includes API's to play, pause, stop and start sound. The definitions for these API's are set forth in Appendix A and the functions of the routines are briefly described here.

A routine called "SoundComponentPlaySourceBuffer", herein called "PlaySourceBuffer", uses a sound parameter block 500, specified as an argument to the routine, to start a new sound playing, e.g. prepare one or more chains for playing sound. In response to the issuance of a PlaySourceBuffer command, the steps in FIG. 9 are executed. An application issuing a PlaySourceBuffer command passes as arguments a reference to a sound parameter block, one or more chain identifications, a reference to a sound object and indications of particular actions, if any, which the application specifies to modify its PlaySourceBuffer request. If the sound hardware is used by only a single application, then chain identifications may not be specified.

For example, an application can indicate that the sound hardware is to perform the processing of audio data by setting a kPassThrough flag as an action. In that case, the SPS does not build a sound object chain for processing the data. Similarly, an application can specify that the sound be paused, i.e. not played immediately. In that case, the SPS initializes a sound object chain to play the sound, but the playback is paused.

The API in the CMI also includes further commands for manipulating sound after a PlaySourceBuffer command has been issued. The API's include SoundComponentPauseSource, SoundComponentStartSource and SoundComponentStopSource routines, the definitions of which are shown in Appendix A, each of which, for descriptive purposes, is referred to using an abbreviated name below. Each of these routines accepts as arguments a reference to a sound object and one or more chain identifications, typically specified as a reference to a list and a specification as to the number of entries in the list. If the sound hardware is used by only a single application, then chain identifications may not be specified. The PauseSource and StopSource routine pauses or stops, respectively, sound which is being played, while the StartSource routine starts the playing of sound which has been paused or stopped. After a StopSource routine is called and the sound is stopped from playing, a PlaySourceBuffer or a StartSource command is issued to play sound. Unlike a PauseSource command, a StopSource command flushes the buffers so that issuance of a StartSource command does not result in the playing of sound from the point at which the sound was previously stopped.

The CMI further includes an API to transfer data between sound objects. To request data from its source, a sound object typically issues a GetSourceData request, see Appendix A, specifying a reference to the sound object which is its source. The specified sound object performs its function as appropriate and passes along the chain a pointer to a SoundComponentData to the requesting sound object. The data described by the SoundComponentData is located either in the buffer of the sound object identified as the source or, in an optimized SPS as described with reference to FIG. 12, it is located in the buffer of another sound object further along the chain from the source if the source did not perform any operation on the data.

The CMI also includes API's to get and set information about sound objects, as shown in Appendix A. A SoundComponentGetInfo routine is used to access information about the kinds of operations a sound object can perform. A SoundComponentSetInfo call provides a similar function for setting the capabilities and current settings of a sound object. Each of the routines accepts as arguments a reference to a sound object, one or more chain identifications, an indication as to what type of information to get or set, herein called a "selector", and a pointer which specifies either a location into which to return the information or a location from which to retrieve the value to be set. If the information to be returned occupies four bytes or less, than the information itself is preferably returned instead of the pointer.

When a SoundComponentGetInfo call is returning more than four bytes of information, a pointer to a data structure called a SoundComponentInfoList is returned. The SoundComponentInfoList data structure contains a count and a reference, e.g. pointer or address, to a list, where the count specifies the number of entries in the list.

A selector can specify any of a large number of audio capabilities or sound object settings. For example, a selector can specify the sample size, sample rate, audio channels, compression type and digital audio effects of a sound object. Additionally, a selector can specify a sound object's current output sample rate multiplier value, current sample size, current number of audio channels, current left and right volume settings, and current quality setting. For a sound hardware object, a selector can specify, for example, the current sound hardware's mute state, the number of audible volume levels and the current sound hardware volume settings.

The CMI also provides API's for loading, configuring and unloading sound objects to form chains, as shown in Appendix A. An InitOutputDevice routine is called to install a sound hardware object so that it can configure its sound hardware, set default values and perform any special hardware-specific operations.

To form chains, the CMI notifies a sound object as to which other sound object is its source in the chain by calling a SoundComponentSetSource routine, thereby indicating which sound object to call for more data. The SoundComponentSetSource command accepts as arguments a reference to a first sound object, one or more chain identifications and a reference to a second sound object which is to be set as the source for the first sound object.

In addition, the CMI includes a SoundComponentGetSource routine which is used to determine a source for a particular sound object. This routine accepts as arguments a reference to a first sound object and a chain identification and returns a reference to a second sound object which is the source for the specified first sound object. The routine preferably includes a mechanism for indicating that the first sound object does not have a source.

Among other uses, the SoundComponentGetSource and SoundComponentSetSource routines are useful for inserting a new sound object into a middle of a chain between a first sound object and second sound object, where the second sound object is the source for the first sound object, in the following manner. Using the SoundComponentGetSource routine, a source for the first sound object is determined. The SoundComponentSetSource routine is then used to set the new sound object as the source of the first sound object and the second sound object as the source of the new sound object.

The CMI includes API's to create and delete chains. A SoundComponentAddSource routine is provided to create chains, while a RemoveSource routine is provided to delete chains. After the new chain is created and a chain identification for the new chain is returned, the sound hardware object stores this chain identification for later use in differentiating chains.

A SoundComponentRemoveSource routine can be invoked to remove an existing sound object chain. This routine accepts as input a reference to a sound object and one or more chain identifications. This function is typically used only by sound hardware objects linked to sound hardware capable of supporting audio mixing.

Typically, when a SoundComponentRemoveSource routine is called, a mixer invokes a Component Manager call to close its source in the chain identified by the chain identifications specified in the RemoveSource call. In order for a sound object to close, it first closes its source. Thus, a call which closes the source of the mixer results in the chain being closed.

Typically, however, the functionality of the AddSource and RemoveSource is implemented by the mixer.

The CMI also provides API's to allow sound hardware objects to S open and close mixer objects. The OpenMixerSoundComponent and CloseMixerSoundComponent routines accept as arguments a pointer to a description of the data format the associated sound hardware expects to receive, a reference to a mixer object and, optionally, a flag field or other indication of additional information about the format of data that the associated sound hardware expects to receive.

The CMI also provides an API to allow sound objects to request and access more source data. A SoundComponentGetSourceData routine accepts as input a reference to a sound object and returns a reference to data.

The CMI also provides an API to inform a sound object as to the format in which to output data. A SoundComponentSetOutput routine accepts as input a reference to a sound object and a reference to a data structure specifying the format for the output data. If the sound object can not output data in the specified format, the sound object indicates which format(s) it can support.

The modular architecture which insulates objects other than sound hardware objects from knowledge about sound hardware, along with the common API used by the sound objects, produce an SPS in which a particular sound object or sound hardware can be easily added or removed from the SPS without substantial rewriting and recompilation of the entire SPS. Thus, it provides an efficient mechanism for adding, replacing or removing functionality from the SPS.

The foregoing description has been limited to a specific embodiment of this invention. It will be apparent, however, that variations and modifications may be made to the invention with the attainment of some or all of its advantages. Therefore, it is the object of the appended claims to cover all such variations and modifications as come within the true spirit and scope of the invention.

PATENT ---- P1335

APPENDIX A

```
/*
    File:        SoundComponents.h

Contains:    Prototypes for Sound Components

Written by:  Jim Reekes and Kip Olson

Copyright:   © 1991-1994 by Apple Computer, Inc., all rights reserved.

Change History (most recent first):

*/ ifndef __SOUNDCOMPONENTS__
define __SOUNDCOMPONENTS__

//~~~~~~~~~~~~~~~~~~~~~~~~~~~~~~~~~~~~~~~~~~~~~~~~~~~~~~~~~~~~~~~~~~~~~~~~~~~~
// C include files cannot be used by Rez
//~~~~~~~~~~~~~~~~~~~~~~~~~~~~~~~~~~~~~~~~~~~~~~~~~~~~~~~~~~~~~~~~~~~~~~~~~~~~ ifndef forRez include <Components.h>
    #include <Sound.h> endif

//~~~~~~~~~~~~~~~~~~~~~~~~~~~~~~~~~~~~~~~~~~~~~~~~~~~~~~~~~~~~~~~~~~~~~~~~~~~~
// constants
//~~~~~~~~~~~~~~~~~~~~~~~~~~~~~~~~~~~~~~~~~~~~~~~~~~~~~~~~~~~~~~~~~~~~~~~~~~~~

// sound component types and subtypes define kNoSoundComponentType   '****' define kSoundComponentType     'sift'
define         kRate8SubType           'ratb'  /* 8-bit rate converter */
define         kRate16SubType          'ratw'  /* 16-bit rate converter */
define         kConverterSubType       'conv'  /* sample format converter */
define         kSndSourceSubType       'sour'  /* generic source component */ define kMixerType              'mixr'
define         kMixer8SubType          'mixb'  /* 8-bit mixer */
define         kMixer16SubType         'mixw'  /* 16-bit mixer */

// these component types must match the gestaltSoundHardware result
define         kClassicSubType         'clas'
define         kASCSubType             'asc '
define         kDSPSubType             'dsp '
define         kAwacsSubType           'awac'
define         kSingerSubType          'sing' define kSoundCompressor        'scom'
define kSoundDecompressor      'sdec'
define         kMace3SubType           'MAC3'      /* MACE 3:1 */
define         kMace6SubType           'MAC6'      /* MACE 6:1 */ define kSoundComponentCodeType   kSoundComponentType

// Audio components and sub-types
define kAudioComponentType     'adio'
```

35

I

```
#define kAudioCodeType              kAudioComponentType
#define kAwacsPhoneSubType          'hphn'
#define kAudioVisionSpeakerSubType  'telc'
#define kAudioVisionHeadphoneSubType 'telh'

// sound component set/get info selectors
#define siVolume                'volu'
#define siHardwareVolume        'hvol'
#define siSpeakerVolume         'svol'
#define siHeadphoneVolume       'pvol'
#define siHardwareVolumeSteps   'hstp'
#define siHeadphoneVolumeSteps  'hdst'
#define siHardwareMute          'hmut'
#define siSpeakerMute           'smut'
#define siHeadphoneMute         'pmut'
#define siRateMultiplier        'rmul'
#define siQuality               'qual'

// format types
#define kOffsetBinary           'raw '
#define kTwosComplement         'twos'
#define kMACE3Compression       'MAC3'
#define kMACE6Compression       'MAC6'

// quality flags
#define kBestQuality            (1 << 0)    /* use interpolation */

// features flags
#define k8BitRawIn              (1 << 0)    /* data description */
#define k8BitTwosIn             (1 << 1)
#define k16BitIn                (1 << 2)
#define kStereoIn               (1 << 3)
#define k8BitRawOut             (1 << 8)
#define k8BitTwosOut            (1 << 9)
#define k16BitOut               (1 << 10)
#define kStereoOut              (1 << 11)

#define kReverse                (1 << 16)   /* function description */
#define kRateConvert            (1 << 17)
#define kCreateSoundSource      (1 << 18)

#define kHighQuality            (1 << 22)   /* performance description */
#define kRealTime               (1 << 23)

#define kInputMask              0x000000FF  /* masks off input bits */
#define kOutputMask             0x0000FF00  /* masks off output bits */
#define kOutputShift            8           /* amount output bits are shifted */
#define kActionMask             0x00FF0000  /* masks off action bits */
define kSoundComponentBits     0x00FFFFFF // SoundComponentPlaySourceBuffer action flags
define kSourcePaused           (1 << 0)

#define kPassThrough            (1 << 16)
#define kNoSoundComponentChain  (1 << 17)

// flags for OpenMixerSoundComponent
#define kNoMixing               (1 << 0)    /* don't mix source */
#define kNoSampleRateConversion (1 << 1)    /* don't convert sample rate */
#define kNoSampleSizeConversion (1 << 2)    /* don't convert sample size */
#define kNoSampleFormatConversion (1 << 3)  /* don't convert sample format */
#define kNoChannelConversion    (1 << 4)    /* don't convert stereo/mono */
#define kNoDecompression        (1 << 5)    /* don't decompress */
```

PATENT ---- P1335

```
        #define kNoVolumeConversion      (1 << 6)     /* don't apply volume */
        #define kNoRealtimeProcessing    (1 << 7)     /* won't run at interrupt time */

//~~~~~~~~~~~~~~~~~~~~~~~~~~~~~~~~~~~~~~~~~~~~~~~~~~~~~~~~~~~~~~~~~~~~~~~~
        // typedefs
        //~~~~~~~~~~~~~~~~~~~~~~~~~~~~~~~~~~~~~~~~~~~~~~~~~~~~~~~~~~~~~~~~~~~~~~~~

// typedefs cannot be used by Rez
        #ifndef forRez

// This type consists of an 8 bit, 2's complement integer part in the high byte,
        // with an 8 bit fractional part in the low byte; its range is -128 to 127.99609375
        typedef short ShortFixed;

typedef struct SoundComponentData SoundComponentData;
        typedef struct SoundComponentData *SoundComponentDataPtr;

struct SoundComponentData {
            long            flags;
            OSType          format;
            short           numChannels;
            short           sampleSize;
            UnsignedFixed   sampleRate;
            long            sampleCount;
            Byte            *buffer;
            long            reserved;
        };

typedef struct SoundParamBlock SoundParamBlock;
        typedef SoundParamBlock *SoundParamBlockPtr;

typedef pascal Boolean (*SoundParamProcPtr)(SoundParamBlockPtr *pb);

struct SoundParamBlock {
            long                recordSize;        // size of this record in bytes
            SoundComponentData  desc;              // description of sound buffer
            Fixed               rateMultiplier;    // rate multiplier to apply to sound
            short               leftVolume;        // volumes to apply to sound
            short               rightVolume;
            long                quality;           // quality to apply to sound
            ComponentInstance   filter;            // filter to apply to sound
            SoundParamProcPtr   moreRtn;           // routine to call to get more data
            SoundParamProcPtr   completionRtn;     // routine to call when buffer is complete
            long                refCon;            // user refcon
            short               result;            // result
        };

// private thing to use as a reference to a chain
        typedef struct privateSoundSource *SoundSource;

typedef struct CompressionInfo CompressionInfo;
        typedef CompressionInfo *CompressionInfoPtr;
        typedef CompressionInfoPtr *CompressionInfoHandle;

struct CompressionInfo {
            long     recordSize;
            OSType   format;
            short    compressionID;
            short    samplesPerPacket;
            short    bytesPerPacket;
            short    bytesPerFrame;
            short    bytesPerSample;
```

PATENT ---- P1335

```
    short       futureUse1;
};

endif

//~~~~~~~~~~~~~~~~~~~~~~~~~~~~~~~~~~~~~~~~~~~~~~~~~~~~~~~~~~~~~~~~~~~~~~~~~~
// functions for sound components
//~~~~~~~~~~~~~~~~~~~~~~~~~~~~~~~~~~~~~~~~~~~~~~~~~~~~~~~~~~~~~~~~~~~~~~~~~~

// routines cannot be used by Rez
ifndef forRez

/* first selector that can be delegated up the chain*/
define kDelegatedSoundComponentSelector 0x0100

// Sound Component dispatch selectors
enum {
/* these calls cannot be delegated */
  kSoundComponentInitOutputDeviceSelect = 1,
  kSoundComponentSetSourceSelect,
  kSoundComponentGetSourceSelect,
  kSoundComponentGetSourceDataSelect,
  kSoundComponentSetOutputSelect, /* these calls can be delegated */
  kSoundComponentAddSourceSelect = kDelegatedSoundComponentSelectors + 1,
  kSoundComponentRemoveSourceSelect, kSoundComponentGetInfoSelect,
  kSoundComponentSetInfoSelect, kSoundComponentStartSourceSelect,
  kSoundComponentStopSourceSelect,
  kSoundComponentPauseSourceSelect,
  kSoundComponentPlaySourceBufferSelect
};

ifdef __cplusplus
extern "C" {
endif

//~~~~~~~~~~~~~~~~~~~~~~~~~~~~~~~~~~~~~~~~~~~~~~~~~~~~~~~~~~~~~~~~~~~~~~~~~~
// Sound Manager 3.0 utilities pascal OSErr OpenMixerSoundComponent(SoundComponentDataPtr outputDescription, long
outputFlags, ComponentInstance *mixerComponent)
  = {0x203C,0x0614,0x0018,0xA800};

pascal OSErr CloseMixerSoundComponent(ComponentInstance ci)
  = {0x203C,0x0218,0x0018,0xA800};

//~~~~~~~~~~~~~~~~~~~~~~~~~~~~~~~~~~~~~~~~~~~~~~~~~~~~~~~~~~~~~~~~~~~~~~~~~~
// basic sound component functions pascal ComponentResult SoundComponentInitOutputDevice(ComponentInstance ti, long
actions)
  = ComponentCallNow(kSoundComponentInitOutputDeviceSelect, sizeof(long));

pascal ComponentResult SoundComponentSetSource(ComponentInstance ti, SoundSource
sourceID, ComponentInstance source)
```

38

```
    = ComponentCallNow(kSoundComponentSetSourceSelect, sizeof(SoundSource) +
    sizeof(ComponentInstance));

pascal ComponentResult SoundComponentGetSource(ComponentInstance ti, SoundSource
    sourceID, ComponentInstance *source)
    = ComponentCallNow(kSoundComponentGetSourceSelect, sizeof(SoundSource) +
    sizeof(ComponentInstance));

pascal ComponentResult SoundComponentGetSourceData(ComponentInstance ti,
    SoundComponentDataPtr *sourceData)
    = ComponentCallNow(kSoundComponentGetSourceDataSelect,
    sizeof(SoundComponentDataPtr));

pascal ComponentResult SoundComponentSetOutput(ComponentInstance ti,
    SoundComponentDataPtr requested, SoundComponentDataPtr *actual)
    = ComponentCallNow(kSoundComponentSetOutputSelect, sizeof(SoundComponentDataPtr) +
    sizeof(SoundComponentDataPtr));

//~~~~~~~~~~~~~~~~~~~~~~~~~~~~~~~~~~~~~~~~~~~~~~~~~~~~~~~~~~~~~~~~~~~~~~~~
// junction methods for the mixer, must be called at non-interrupt level pascal ComponentResult SoundComponentAddSource(ComponentInstance ti, SoundSource
    *sourceID)
    = ComponentCallNow(kSoundComponentAddSourceSelect, sizeof(SoundSource));

pascal ComponentResult SoundComponentRemoveSource(ComponentInstance ti, SoundSource
    sourceID)
    = ComponentCallNow(kSoundComponentRemoveSourceSelect, sizeof(SoundSource));

//~~~~~~~~~~~~~~~~~~~~~~~~~~~~~~~~~~~~~~~~~~~~~~~~~~~~~~~~~~~~~~~~~~~~~~~~
// info methods pascal ComponentResult SoundComponentGetInfo(ComponentInstance ti, SoundSource
    sourceID, OSType selector, void *infoPtr)
    = ComponentCallNow(kSoundComponentGetInfoSelect, sizeof(SoundSource) + sizeof(OSType)
    + sizeof(Ptr));

pascal ComponentResult SoundComponentSetInfo(ComponentInstance ti, SoundSource
    sourceID, OSType selector, void *infoPtr)
    = ComponentCallNow(kSoundComponentSetInfoSelect, sizeof(SoundSource) + sizeof(OSType)
    + sizeof(Ptr));

//~~~~~~~~~~~~~~~~~~~~~~~~~~~~~~~~~~~~~~~~~~~~~~~~~~~~~~~~~~~~~~~~~~~~~~~~
// control methods pascal ComponentResult SoundComponentStartSource(ComponentInstance ti, short count,
    SoundSource *sources)
    = ComponentCallNow(kSoundComponentStartSourceSelect, sizeof(short) +
    sizeof(SoundSource));

pascal ComponentResult SoundComponentStopSource(ComponentInstance ti, short count,
    SoundSource *sources)
    = ComponentCallNow(kSoundComponentStopSourceSelect, sizeof(short) +
    sizeof(SoundSource));

pascal ComponentResult SoundComponentPauseSource(ComponentInstance ti, short count,
    SoundSource *sources)
    = ComponentCallNow(kSoundComponentPauseSourceSelect, sizeof(short) +
    sizeof(SoundSource));
```

```
pascal ComponentResult SoundComponentPlaySourceBuffer(ComponentInstance ti,
SoundSource sourceID, SoundParamBlockPtr pb, long actions)
    = ComponentCallNow(kSoundComponentPlaySourceBufferSelect, sizeof(SoundSource)
                                    + sizeof(SoundParamBlockPtr) + sizeof(long));

#ifdef __cplusplus
}
#endif

// if not for Rez
#endif

// if already included
#endif
```

We claim:

1. A method for processing one or more streams of audio signals in a computer having a processor coupled to a storage medium and having an object-oriented dynamic binding mechanism resident is the storage medium so that the processor can access and execute the binding mechanism, said method comprising the steps:

receiving a request to become ready to play sound from a software application;

in response to the request to become ready to play sound, generating a chain of sound objects for processing at least one stream of audio signals, a sound object being specialized for a particular task, the chain of sound objects having a sound source object linked to a source of audio signals, a sound hardware object linked to a sound hardware, and a series of processing objects, the series having a first end coupled to the sound source object for receiving audio signals therefrom and a second end coupled to the sound hardware object for receiving requests therefrom and sending audio signals thereto, and passing the request along the chain from the sound hardware object to the sound source object, each sound object accessing and storing information in the request which is pertinent to its particular task;

receiving at a sound hardware object a request other than a request to become ready to play sound; and in response to the request, passing the request along a chain in a direction toward a source sound object of the chain until a sound object is found which is capable of handling requests of a type such as the request or until each sound object in the chain is examined, whichever occurs first, if a sound object is found to handle the request, then handling the request, requesting and getting from a source of the found sound object more audio signals if needed to handle the request and passing the response to the request along the chain toward the sound hardware object, each sound object operating on the data, if appropriate, and if a sound object is not found, then passing along the chain to the sound hardware object, an indication that the request can not be handled.

2. An apparatus for processing one or more streams of audio signals in a computer having a processor coupled to a storage medium, said apparatus comprising:

an object-oriented dynamic binding mechanism resident in the storage medium;

a software application resident in the storage medium for making a sound request which is received by the binding mechanism; and a chain of sound objects generated by the binding mechanism in response to the request, each sound object for processing at least one stream of audio signals and each sound object being specialized for a particular task, the chain of sound objects having a sound source object linked to a source of audio signals, a sound hardware object linked to a sound hardware in the computer, and a series of sound processing objects, the series having a first end coupled to the sound source object for receiving audio signals therefrom and a second end coupled to the sound hardware object for receiving requests therefrom and sending audio signals thereto, each sound object in the chain of sound objects having a connection for passing the request along the chain from the sound hardware object to the sound source object, each sound object having storage for storing information from the request which is pertinent to its particular task.

3. An apparatus for processing one or more streams of digital audio signals on a processor coupled to a storage medium, said apparatus comprising:

an object-oriented dynamic binding mechanism;

a plurality of sound objects, each sound object created by the binding mechanism and capable of performing at least one task, each of the sound objects in the plurality of sound objects having a common application programmer's interface and calling conventions; and one or more chains of sound objects, each chain containing at least one sound object, said chains formed by the binding mechanism such that each chain processes at least one stream of digital audio signals, at least one of the one or more chains comprising a sound source object for retrieving digital audio signals from a software application and one or more signal sound processing objects for processing the retrieved digital audio signals, said one or more signal sound processing objects connected in series and said series of sound processing objects having a first end and a second end, the first end coupled to receive output from the sound source object and the second end coupled to a sound hardware object capable of being linked with and communicating with a sound hardware.

4. An apparatus as in claim 3 wherein the series of signal sound processing objects comprises a decompressor having a first end and a second end, said decompressor located at the first end of the series such that its first end is coupled to receive output from the sound source object, a sample rate converter having a first end and a second end, the first end coupled to the second end of the decompressor, a mixer having a first end and a second end, the first end coupled to the second end of the sample rate converter.

* * * * *